US012008603B2

(12) United States Patent
Stoliartchouk et al.

(10) Patent No.: US 12,008,603 B2
(45) Date of Patent: Jun. 11, 2024

(54) SYSTEM AND METHOD FOR DYNAMIC CREATION OF PRODUCT LINKS FROM A WEB BROWSER APPLICATION

(71) Applicant: rewardStyle, Inc., Dallas, TX (US)

(72) Inventors: Alexei Stoliartchouk, Kensington, CA (US); Forrest Jordan, Dallas, TX (US); Baxter Box, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 0 days.

(21) Appl. No.: 18/156,603

(22) Filed: Jan. 19, 2023

(65) Prior Publication Data
US 2023/0153865 A1    May 18, 2023

Related U.S. Application Data

(63) Continuation of application No. 17/661,648, filed on May 2, 2022, which is a continuation of application
(Continued)

(51) Int. Cl.
*G06F 17/00* (2019.01)
*G06F 9/00* (2006.01)
(Continued)

(52) U.S. Cl.
CPC ........... *G06Q 30/0277* (2013.01); *G06F 9/00* (2013.01); *G06Q 30/00* (2013.01)

(58) Field of Classification Search
CPC ....... G06Q 30/0277; G06Q 30/00; G06F 9/00
See application file for complete search history.

(56) References Cited

U.S. PATENT DOCUMENTS

| 5,812,769 A | 9/1998 | Graber et al. |
| 6,029,141 A | 2/2000 | Bezos et al. |

(Continued)

FOREIGN PATENT DOCUMENTS

| WO | 2007021974 A | 2/2007 |
| WO | 2007021974 A2 | 2/2007 |

(Continued)

OTHER PUBLICATIONS

Harlan, "Amazon Associate Links Made Simple", published on Jun. 26, 2010, online at https://401stblow.wordpress.com/2010/06/26/amazon-associates-links-made-simple/, attached as Harlan 2010.pdf.
(Continued)

*Primary Examiner* — Mohammed H Zuberi
(74) *Attorney, Agent, or Firm* — Bookoff McAndrews, PLLC

(57) ABSTRACT

A method and system is provided for facilitating affiliate link generation using a web browser application. A publisher enables the system by identifying a webpage on an affiliate web site. The system performs an initial assessment of the page to extract webpage information, which is compared to information stored in a database. If the extracted information matches stored information, a record of the webpage is displayed and an affiliate link is dynamically generated for immediate use. If the extracted information does not match stored information, a new record of the webpage is created. If the webpage contains product-specific data, a product-specific record is stored. If the webpage does not contain product-specific data, a non-product record is stored. An affiliate link is then dynamically created. The new record of the product and dynamically created affiliate link is added to the database for immediate use.

20 Claims, 22 Drawing Sheets

Related U.S. Application Data

No. 17/205,540, filed on Mar. 18, 2021, now Pat. No. 11,354,710, which is a continuation of application No. 16/679,843, filed on Nov. 11, 2019, now Pat. No. 11,017,441, which is a continuation of application No. 13/838,578, filed on Mar. 15, 2013, now Pat. No. 10,475,084, which is a continuation-in-part of application No. 13/731,383, filed on Dec. 31, 2012, now Pat. No. 9,779,425, which is a continuation-in-part of application No. 13/547,771, filed on Jul. 12, 2012, now Pat. No. 11,010,795.

(60) Provisional application No. 61/617,857, filed on Mar. 30, 2012.

(51) Int. Cl.
*G06Q 30/00* (2023.01)
*G06Q 30/0241* (2023.01)

(56) References Cited

U.S. PATENT DOCUMENTS

| | | | |
|---|---|---|---|
| 6,141,666 | A | 10/2000 | Tobin |
| 6,334,111 | B1 | 12/2001 | Carrott |
| 6,484,149 | B1 | 11/2002 | Jammes |
| 6,615,238 | B1 | 9/2003 | Melet et al. |
| 6,629,135 | B1 | 9/2003 | Ross, Jr. et al. |
| 7,013,289 | B2 | 3/2006 | Horn |
| 7,032,168 | B1 | 4/2006 | Gerace et al. |
| 7,058,883 | B1 | 6/2006 | Oda |
| 7,359,869 | B1 | 4/2008 | Ananda |
| 7,480,627 | B1 | 1/2009 | Van Horn et al. |
| 7,617,122 | B2 | 11/2009 | Kumar et al. |
| 7,686,023 | B2 | 3/2010 | Abraham |
| 7,827,055 | B1 | 11/2010 | Snodgrass |
| 7,827,056 | B2 | 11/2010 | Snodgrass |
| 8,285,598 | B2 | 10/2012 | Mesaros |
| 8,515,825 | B1 | 8/2013 | Ross, Jr. |
| 8,595,186 | B1 | 11/2013 | Mandyam |
| 9,076,151 | B2 | 7/2015 | Patton |
| 9,143,478 | B2 | 9/2015 | Ramaswamy |
| 9,208,247 | B2 | 12/2015 | Gardner |
| 9,276,994 | B2 | 3/2016 | Lakes |
| 9,495,693 | B2 | 11/2016 | Box |
| 9,607,307 | B2 | 3/2017 | Lee |
| 9,734,504 | B2 | 8/2017 | Chernaik |
| 9,779,425 | B2 | 10/2017 | Stoliartchouk |
| 9,806,942 | B2 | 10/2017 | Saxena |
| 9,838,457 | B2 | 12/2017 | Lakes |
| 10,069,905 | B2 | 9/2018 | Lv |
| 10,177,967 | B2 | 1/2019 | Lakes |
| 10,382,386 | B2 | 8/2019 | Gissing |
| 10,475,084 | B2 | 11/2019 | Stoliartchouk |
| 10,498,847 | B2 | 12/2019 | Popowitz |
| 10,506,075 | B1 | 12/2019 | Vaidya |
| 10,535,080 | B2 | 1/2020 | Jordan |
| 10,600,019 | B1 | 3/2020 | Atkinson |
| 10,846,361 | B2 | 11/2020 | Tsirkin |
| 11,017,347 | B2 | 5/2021 | Choudhury |
| 2001/0020231 | A1 | 9/2001 | Perri, III |
| 2002/0062948 | A1 | 5/2002 | Baudu |
| 2002/0128916 | A1 | 9/2002 | Beinecke, III |
| 2002/0184095 | A1 | 12/2002 | Scullard et al. |
| 2003/0023687 | A1 | 1/2003 | Wolfe |
| 2003/0182185 | A1 | 9/2003 | Dodd |
| 2003/0233425 | A1 | 12/2003 | Lyons |
| 2003/0236701 | A1 | 12/2003 | Rowney |
| 2004/0044565 | A1 | 3/2004 | Kumar et al. |
| 2004/0059632 | A1 | 3/2004 | Kang |
| 2004/0103022 | A1 | 5/2004 | Chilcoat, III |
| 2004/0199762 | A1 | 10/2004 | Carlson et al. |
| 2005/0065806 | A1 | 3/2005 | Hank |
| 2005/0119937 | A1 | 6/2005 | Estes |
| 2005/0171842 | A1 | 8/2005 | Tien |
| 2005/0182707 | A1 | 8/2005 | Yeager |
| 2006/0106665 | A1 | 5/2006 | Kumar |
| 2006/0129463 | A1 | 6/2006 | Zicherman |
| 2006/0229936 | A1 | 10/2006 | Cahill |
| 2007/0079326 | A1 | 4/2007 | Datta |
| 2007/0088713 | A1 | 4/2007 | Baxter et al. |
| 2007/0124414 | A1 | 5/2007 | Bedingfield, Sr. |
| 2007/0260520 | A1* | 11/2007 | Jha ............... G06Q 30/0245 705/14.46 |
| 2007/0265921 | A1 | 11/2007 | Rempe |
| 2007/0288312 | A1 | 12/2007 | Wang |
| 2007/0288431 | A1 | 12/2007 | Reitter |
| 2008/0065476 | A1 | 3/2008 | Klein et al. |
| 2008/0120156 | A1 | 5/2008 | Nusbaum |
| 2008/0126515 | A1 | 5/2008 | Chambers et al. |
| 2008/0133365 | A1 | 6/2008 | Sprecher et al. |
| 2008/0208682 | A1 | 8/2008 | Chandley et al. |
| 2008/0221987 | A1 | 9/2008 | Sundaresan |
| 2008/0281688 | A1 | 11/2008 | Kluth |
| 2009/0017804 | A1 | 1/2009 | Sarukkai |
| 2009/0018917 | A1 | 1/2009 | Chapman et al. |
| 2009/0106098 | A1 | 4/2009 | Getz |
| 2009/0164271 | A1 | 6/2009 | Johnson |
| 2009/0228366 | A1 | 9/2009 | Biris |
| 2009/0254838 | A1 | 10/2009 | Rao et al. |
| 2009/0281893 | A1 | 11/2009 | Muhonen et al. |
| 2010/0010887 | A1 | 1/2010 | Karlin et al. |
| 2010/0036703 | A1 | 2/2010 | Chen |
| 2010/0042635 | A1 | 2/2010 | Venkataramanujam |
| 2010/0058160 | A1 | 3/2010 | Navarro |
| 2010/0082360 | A1 | 4/2010 | Chien et al. |
| 2010/0088170 | A1 | 4/2010 | Glore, Jr. et al. |
| 2010/0306249 | A1 | 12/2010 | Hill |
| 2011/0004593 | A1 | 1/2011 | Ross |
| 2011/0082730 | A1 | 4/2011 | Karlin et al. |
| 2011/0106628 | A1 | 5/2011 | Nam et al. |
| 2011/0238528 | A1 | 8/2011 | Bezos et al. |
| 2011/0313848 | A1 | 12/2011 | Vaidyanathan |
| 2012/0005024 | A1 | 1/2012 | Fernandez Gutierrez |
| 2012/0130849 | A1 | 5/2012 | Katz |
| 2012/0173682 | A1 | 7/2012 | Lakes |
| 2012/0245976 | A1 | 9/2012 | Kumar et al. |
| 2012/0253918 | A1 | 10/2012 | Marois et al. |
| 2012/0303425 | A1 | 11/2012 | Katzin |
| 2012/0323666 | A1 | 12/2012 | King |
| 2012/0323898 | A1 | 12/2012 | Kumar |
| 2013/0019148 | A1 | 1/2013 | Spencer |
| 2013/0046621 | A1 | 2/2013 | Asseoff |
| 2013/0110586 | A1 | 5/2013 | Nesbitt |
| 2013/0151416 | A1 | 6/2013 | Ng et al. |
| 2013/0204701 | A1 | 8/2013 | Calafiore et al. |
| 2013/0268367 | A1 | 10/2013 | Erdogan |
| 2014/0019248 | A1 | 1/2014 | Stoliartchouk |
| 2014/0019266 | A1 | 1/2014 | Stoliartchouk |
| 2014/0195893 | A1 | 7/2014 | Lei |
| 2014/0229270 | A1 | 8/2014 | Rashwan |

FOREIGN PATENT DOCUMENTS

| | | | |
|---|---|---|---|
| WO | 2007/092358 | A2 | 8/2007 |
| WO | 2008002335 | A1 | 1/2008 |
| WO | 2009006606 | A1 | 1/2009 |
| WO | 2009045405 | A1 | 4/2009 |
| WO | 2009126941 | A1 | 10/2009 |
| WO | 2010090783 | A2 | 8/2010 |
| WO | 2011121455 | A2 | 10/2011 |
| WO | 2013148356 | A1 | 10/2013 |
| WO | 2013150479 | A2 | 10/2013 |

OTHER PUBLICATIONS

Belderbos, "Javascript Bookmarket to Build Affiliate, Links to Amazon", published online on Jun. 29, 2012, at https://bobbelderbos.com/2012/06/javascript-bookmarklet-build-affiliate-links-amazon/ (Year: 2012).

Dunlop, "7 Best Plugins for Monetization," published online on Oct. 16, 2011 at https://www.incomediary.com/7-best-plugins-for-monetization (Year: 2011).

(56) References Cited

OTHER PUBLICATIONS

Stoyan, ("Short Amazon affiliate links—a bookmarklet", published online at https://www.phpied.com/short-amazon-affiliate-links-a-bookmarklet/on Oct. 19, 2008, (Year: 2008).

The Reply in response to the Communication dated Feb. 9, 2017 as filed with the European Patent Office on May 15, 2017 for co-pending European patent application No. 13717619.4.

The Reply in response to the Communication dated Dec. 2, 2016 as filed with the European Patent Office on Jun. 8, 2017 for corresponding European patent application No. 15713059.2.

The Reply in response to the Communication dated Mar. 8, 2016, as filed with European Patent Office on Sep. 16, 2016 for co-pending European Application No. 13717619.4.

The Communication dated Feb. 9, 2017 issued by the European Patent Office for co-pending European patent application No. 13717619.4.

The Reply in response to the Communication dated Mar. 8, 2016 as filed with the European Patent Office on Sep. 16, 2016 for the co-pending European patent application No. 13717619.4.

The Supplementary Search Report mailed by European Search Report issued by European Patent Office dated Feb. 18, 2016 for the co-pending European patent application No. 13717619.4.

The Communication issued by the European Patent Office dated Mar. 8, 2016 for the co-pending European patent application No. 13717619.4.

The Reply in response to the Communication dated Mar. 8, 2016 as filed with the European Patent Office on Sep. 16, 2016 for co-pending European patent application No. 13717619.4.

The International Preliminary Report on Patentability issued by USPTO dated Mar. 17, 2016 for PCT Application No. PCT/US2015/019212.

International Search Report for corresponding application PCT/US2013/034151 dated Oct. 1, 2013.

Written Opinion of the International Searching Authority for corresponding application PCT/US2013/034151 dated Oct. 1, 2013.

* cited by examiner

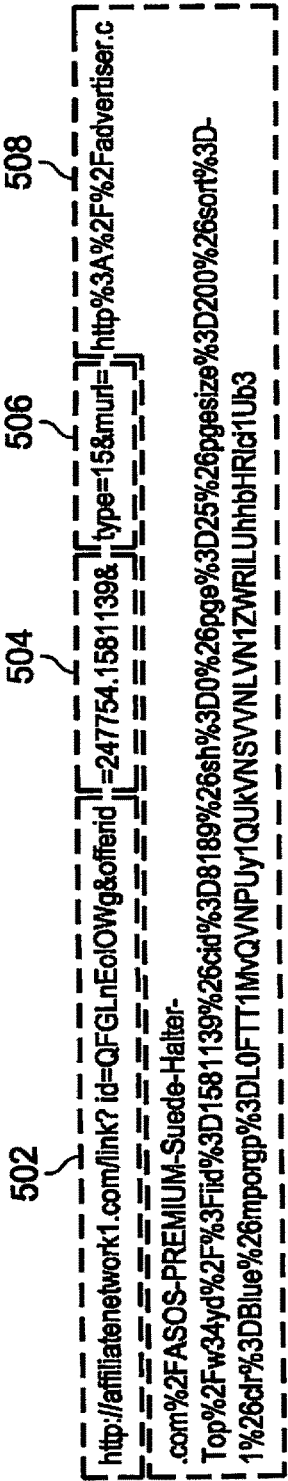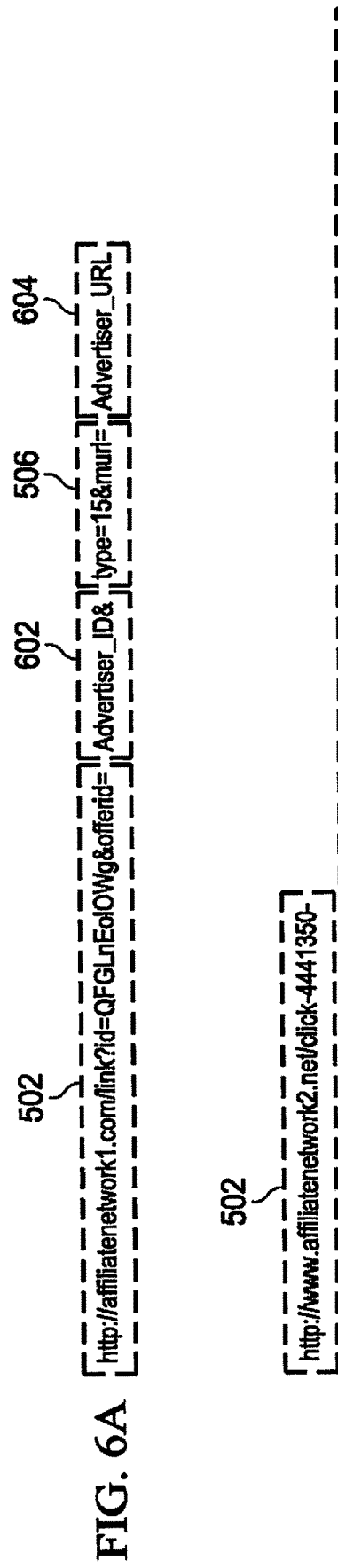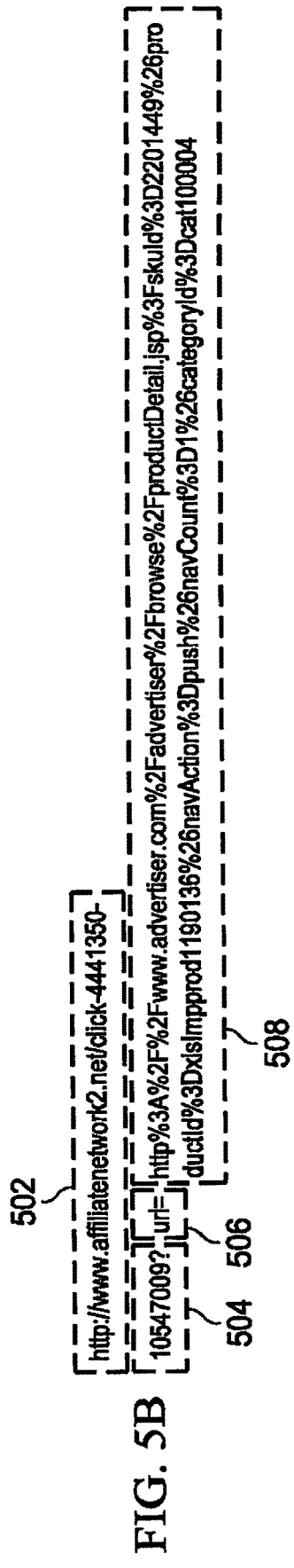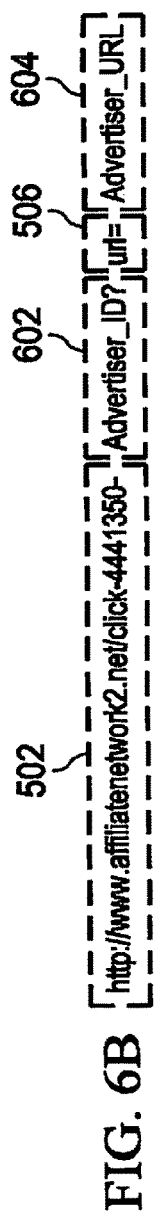
FIG. 5A
FIG. 6A
FIG. 5B
FIG. 6B

FIG. 10 rewardStyle www.rewardstyle.com/myaccount

Welcome Steven  Today's Commission: $0.00
Total Payment Due: $0.00  Lifetime Commission: $0.00

My Account | Log Out rewardStyle®  HAVE PUBLISHER FRIENDS? *invite now*
earn referral commissions for one year!

PRODUCTS | ADVERTISERS | REWARDS | REFERRALS | ANALYTICS | BLOG | APPS

My Account

| Basic Information | Contributors | Currencies | Currently Obsessed |

Basic Information

- Language: English
- *Name:
- Company:
- *Country: United States
- *Mailing Address:
- *City: Dallas
- *State: Texas
- *Zip Code: 75201
- *Phone:
- *Blog Name:
- *Blog URL:
- *Email:
- *PayPal Email:
- *Confirm PayPal Email:
- Notifications: ☐ Receive Newsletter
- Bit.ly: ☐ Bit.ly my rStyle links
- Password: *(click to change)*

1002

[Save Account Information]

FIG. 12

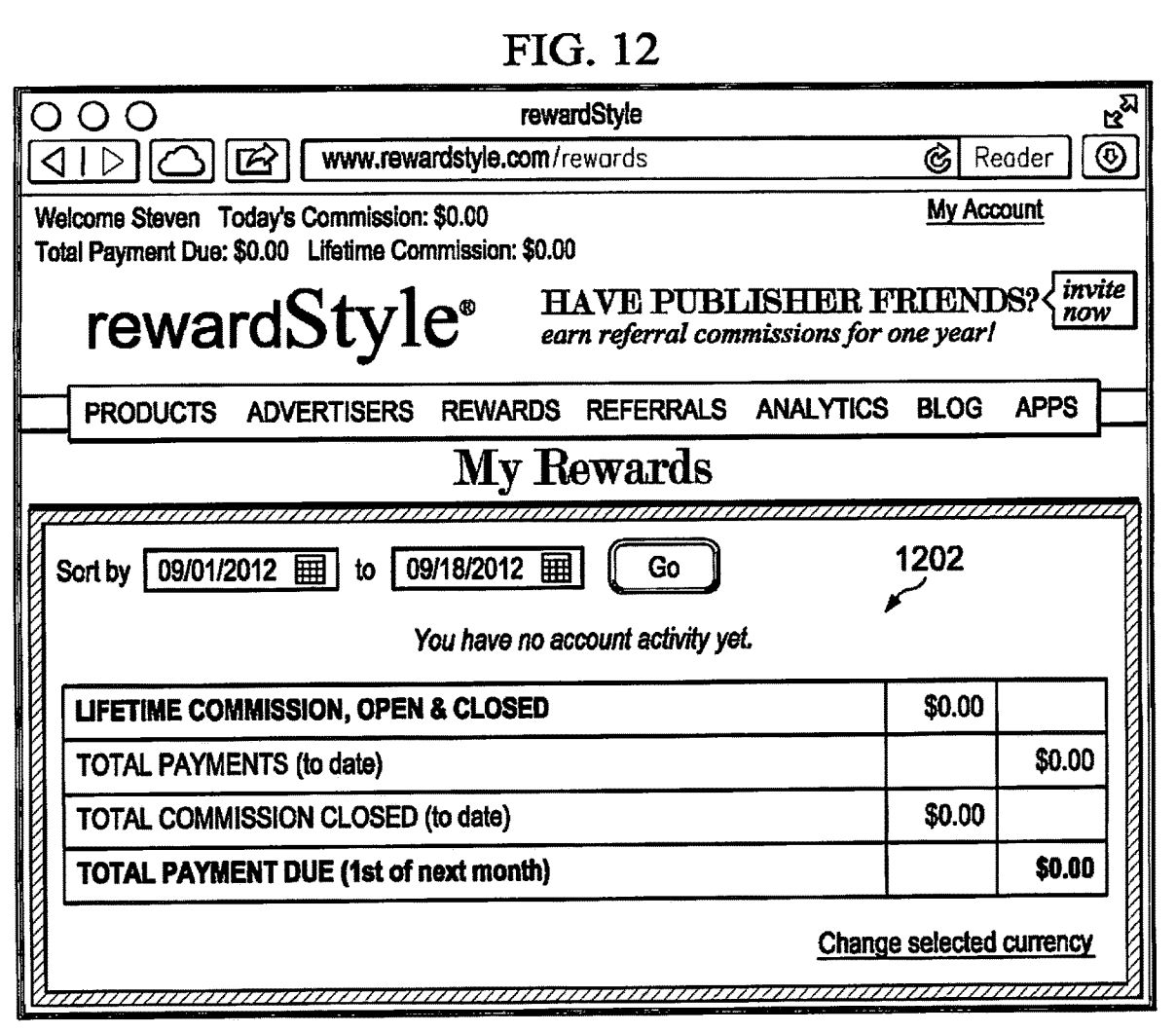

| | | |
|---|---|---|
| LIFETIME COMMISSION, OPEN & CLOSED | $0.00 | |
| TOTAL PAYMENTS (to date) | | $0.00 |
| TOTAL COMMISSION CLOSED (to date) | $0.00 | |
| TOTAL PAYMENT DUE (1st of next month) | | $0.00 |

SYSTEM AND METHOD FOR DYNAMIC CREATION OF PRODUCT LINKS FROM A WEB BROWSER APPLICATION

CROSS-REFERENCE TO RELATED APPLICATIONS

This application is a continuation of and claims the benefit of priority to U.S. patent application Ser. No. 17/661,648, filed on May 2, 2022, which is a continuation of and claims the benefit of priority to U.S. patent application Ser. No. 17/205,540, filed on Mar. 18, 2021, now U.S. Pat. No. 11,354,710, which is a continuation of and claims the benefit of priority to U.S. patent application Ser. No. 16/679,843, filed on Nov. 11, 2019, now U.S. Pat. No. 11,017,441, issued on May 25, 2021, which is a continuation of and claims the benefit of priority to U.S. patent application Ser. No. 13/838,578, filed on Mar. 15, 2013, now U.S. Pat. No. 10,475,084, issued on Nov. 12, 2019, which is a continuation-in-part of and claims the benefit of priority to U.S. patent application Ser. No. 13/731,383, filed on Dec. 31, 2012, now U.S. Pat. No. 9,779,425, issued on Oct. 3, 2017, which is a continuation-in-part of and claims the benefit of priority to U.S. patent application Ser. No. 13/547,771, filed on Jul. 12, 2012, now U.S. Pat. No. 11,010,795, issued on May 18, 2021, which claims the benefit of U.S. Provisional Patent Application No. 61/617,857, filed on Mar. 30, 2012, all of which are incorporated herein by reference in their entireties.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to electronic commerce, and in particular, to an affiliate link generation system for use in online marketing and sales.

2. Description of Related Art Including Information Disclosed Under 37 CFR 1.97 and 1.98

With the rapid evolution of technology in recent years, there has been a growing trend toward online publishing, by businesses, such as online magazine publishers, as well as by individuals, such as personal bloggers. These online publishers frequently review and publish commentary on a variety of products on their web site and via $3^{rd}$ party online social networking sites. Accordingly, online marketing has evolved to include awarding commission to web site operators on sales made to consumers who have arrived at an affiliate's web site through a tracked link on the web site operator's web site.

Typically, web site operators are limited to earning commissions on products supported by a particular external affiliate network for which they can obtain an existing affiliate link. Moreover, these affiliate networks require the use of certain technology, which excludes users not employing the requisite technology.

BRIEF SUMMARY OF THE INVENTION

The invention described herein includes as an embodiment a system for dynamic management of advertiser affiliate links for online marketing, the system comprising: a website for providing a web browser application adapted to embed in a publisher's web browser; and a computerized link generation server in network communication with the web browser application for use in creating a web address URL link to an advertiser affiliate webpage. Additional limitations on this embodiment and alternate embodiments are also envisioned as described herein.

The invention described herein also includes as an embodiment a method for dynamic management of advertiser affiliate links for online marketing, the method steps comprising: providing a web browser application adapted to initiate creation of a web address URL link based upon an advertiser affiliate webpage. Additional limitations on this embodiment and alternate embodiments are also envisioned as described herein.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein:

FIG. 5A depicts the syntax of a typical affiliate network advertiser link URL exemplar for fictional affiliate network "AffiliateNetwork1.com," highlighting additional variables and placeholders utilized by redirection scripts;

FIG. 5B depicts the syntax of a typical affiliate network advertiser link URL exemplar for fictional affiliate network "AffiliateNetwork2.com," highlighting additional variables and placeholders utilized by redirection scripts;

FIG. 6A depicts the parsed syntax of the affiliate network advertiser URL exemplar for fictional affiliate network "AffiliateNetwork1.com," highlighting the various identified parameters;

FIG. 6B depicts the parsed syntax of the affiliate network advertiser URL exemplar for fictional affiliate network "AffiliateNetwork2.com," highlighting the various identified parameters;

FIG. 10 depicts a screen image of a user interface to allow the publisher to manipulate stored publisher data;

FIG. 12 depicts a screen image of a user interface presenting the publisher with a summary of the amount of commissions generated through transactions facilitated by affiliate network advertiser links created in addition to affiliate network advertiser links available in affiliate network inventory databases and provided by the embodiment of the present disclosure;

Figure 1:
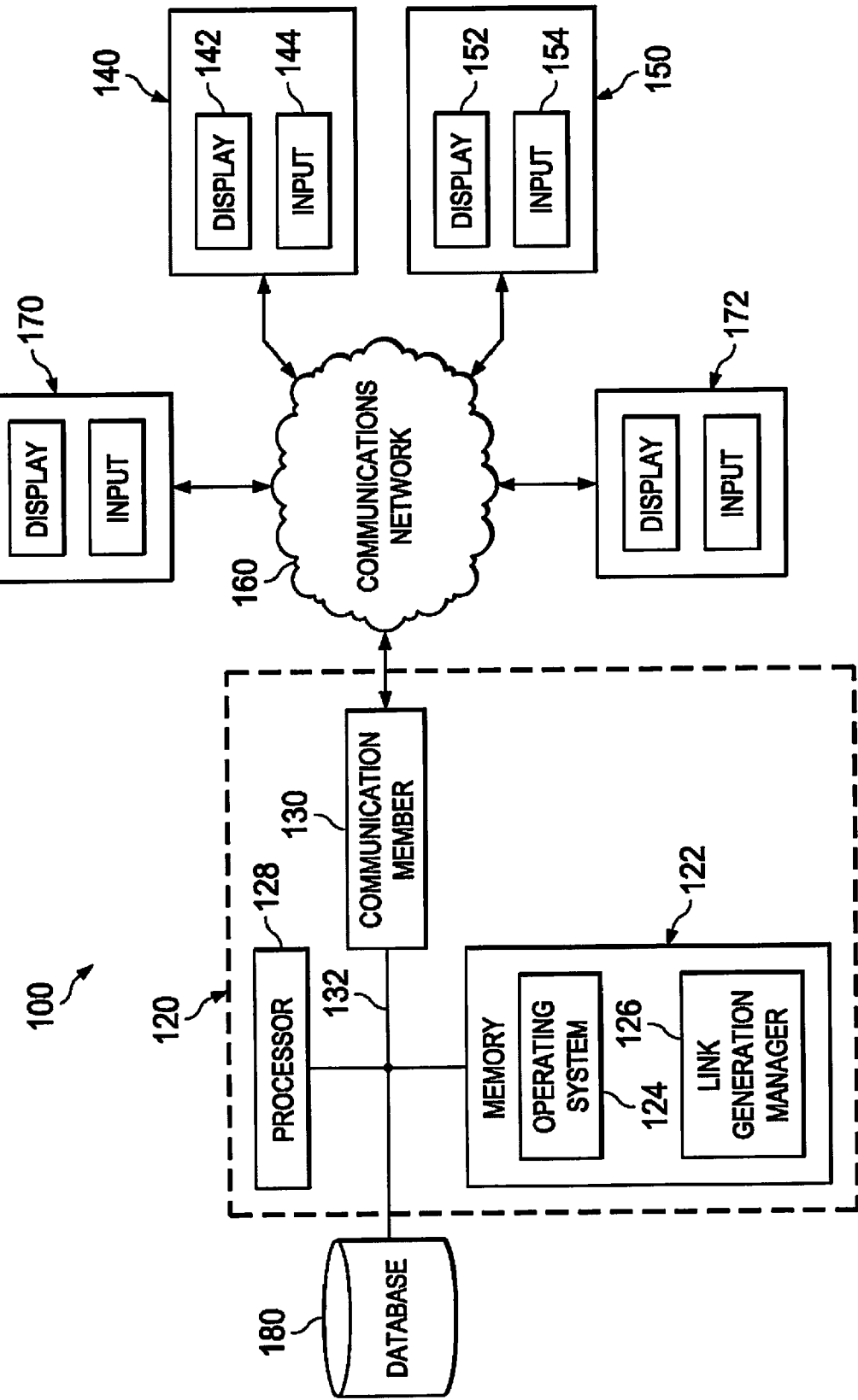
FIG. 1 is a block diagram of a computer environment for implementing an affiliate link generation system in accordance with one embodiment of the present disclosure.

The above figures are provided for the purpose of illustration and description only, and are not intended to define the limits of the disclosed invention. Use of the same reference number in multiple figures is intended to designate the same or similar parts. Furthermore, if the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of one having ordinary skill in the art to which the invention pertains after the following teachings of the present invention have been read and understood.

DETAILED DESCRIPTION OF THE INVENTION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

As used herein, the term "computer readable medium" means any tangible portable or fixed RAM or ROM device, such as portable flash memory, a CDROM, a DVDROM, embedded RAM or ROM integrated circuit devices, or the like.

As used herein, the term "affiliate network advertiser link" and "affiliate link" mean URLs that point (i.e., link) to a website's specific page or subpage (a "deep link"), or to a website's homepage through which a visitor's analytics are tracked. For example, it is possible to create an "affiliate network advertiser link" or "affiliate link" to an advertiser affiliate's home or main webpage, or to an advertiser affiliate's product webpage, and any activity including product purchases are tracked and recorded.

The present disclosure generally provides a system and method of generating affiliate links. More particularly, the present disclosure provides a system and method of aggregating and integrating affiliate links from external affiliate network databases, as well as dynamically generating links for affiliate webpages not located in existing external affiliate network databases.

FIG. 1 generally illustrates an affiliate link generation system 100 according to one embodiment of the present disclosure. It should be understood that system 100 shown in FIG. 1 is for illustrative purposes only and that any other suitable system or subsystem could be used in conjunction with or in lieu of system 100 according to one embodiment of the present disclosure.

System 100 allows an online publisher 140 to communicate and interact with link generation server 120 through a communications network 160. The communications network 160 can be any network capable of supporting the transmission of packetized digital data. For example, the network can be a PAN, LAN, CAN, MAN, WAN, or the like, or some combination thereof. Moreover, connections to said network can be wired or wireless.

Link generation server 120 may generally include a computer system having a memory 122, at least one processor 128, and a communication member 130. Each element of the link generation server 120 is coupled to bus 132 or other communication mechanism for relaying information.

Memory 122 comprises both random access memory (RAM) and read-only memory (ROM). Memory 122 may be employed to store program information, instructions to be executed by processor 128, and temporary information during execution of instructions by processor 128.

Within memory 122 reside operating system 124 and link generation manager 126. Operating system 124 may be employed as a software platform upon which the affiliate link generation application programs may execute. Link generation manager 126 may generally include program instruction sequences for generating affiliate links for affiliate Webpages.

Processor 128 may be employed to execute the program instructions that are stored by memory 122. Processor 128 is capable of identifying and monitoring each online publisher 140 as well as communicating with each online publisher 140 via communications member 130 and communications network 160.

Communication member 130 comprises conventional hardware and software that facilitates coupling link generation server 120 to communications network 160.

In an embodiment, link generation server 120 is coupled to a database 180. Link generation server 120 may store information associated with advertising affiliate Webpages in the database 180. Affiliate Webpage information stored in database 180 may be derived from advertising affiliate sources 170, external affiliate network sources 172, other suitable sources, or any combination thereof. Information stored in database 180 may include affiliate product webpages, affiliate non-product webpages, product commissions, affiliate links if available, product descriptions, advertiser commission rates, product options, product prices, and product pictures, or any other suitable affiliate Webpage information. Link generation server 120 may also store information corresponding to each online publisher 140, such as names, addresses, phone numbers, commission account information, or any other suitable online publisher information, in the database 180.

Online publishers 140 obtain affiliate network advertiser links generated by link generation server 120 by communicating with link generation server 120 through communications network 160. Online publishers 140 may be located in any geographical location accessible by the communications network 160. Likewise, advertising affiliates 170 and affiliate networks 172 communicate with the link generation server 120 through communications network 160, and may also be located in any suitable geographic location accessible by the communications network 160.

Each online publisher 140 may generally include at least one display 142, to view affiliate Webpages and associated information, and at least one input device 144, to communicate with link generation server 120. For example, online publisher 140 may communicate over the network 160 using a standard web browser (e.g., Safari, Internet Explorer) or using a dedicated user interface program that is operable from a computing device, for example, a handheld networked device, a networked desktop computer, a networked kiosk, a tablet computer, or the like.

Link generation server 120 may also communicate link generation information to interested parties 150. Link generation information may include the Webpage, product name, product webpage and online publisher information. Interested parties 150 may include affiliates, representatives of affiliates, marketing consultants, external affiliate networks, other parties interested in link generation data, or any combination thereof.

Each interested party 150 may generally include at least one display 152, to view link generation data, and at least one input device 154, to communicate with link generation server 120 in a fashion similar to that of a publisher.

Any of displays 142 and/or displays 152 may be a mobile phone screen, liquid crystal display (LCD), light emitting diode screen (LED), plasma screen, cathode ray tube (CRT) monitor, high definition television (HDTV) screen, conventional television screen, projection television screen, video conferencing display, other suitable display, or any combination thereof.

Any of input devices 144 and/or input devices 154 may be an alphanumeric keyboard, mouse, trackball, cursor direction keys, touch pad, Touch Tone telephone, wireless telephone, two-way pager, personal digital assistant, voice recognition device, other suitable data input device, or any combination thereof.

The present disclosure is related to the use of link generation server 120 to dynamically generate affiliate links, as described herein. According to one embodiment of the present disclosure, execution of the instructions stored in memory 122 allows processor 128 to implement the functionality described above.

In one embodiment, the core technology used is HTML, CSS, JavaScript on the client facing components of the tool and PHP, Apache, MySQL on the server side. The client part also employs third party JavaScript libraries such as JQuery and easyXDM. One of ordinary skill in the art to which the invention applies will appreciate that such programming languages are commonly known and understood and, as such, require no further description herein. The server part also relies on database 180 with records of products provided by affiliate networks. By way of example but not limitation, current third party affiliate networks include Commission Junction, Linkshare, PepperJam, Google Affiliate Network, and various others. Again, one of ordinary skill in the art will understand and appreciate the operation and utilization of such affiliate networks with regard to online transactions and, as such, no further description herein is required.

In alternative embodiments, hardware circuitry may be used in conjunction with or in lieu of software instructions to implement the present disclosure. However, the present disclosure is not limited to any specific combination of hardware circuitry and/or software.

Figure 2:
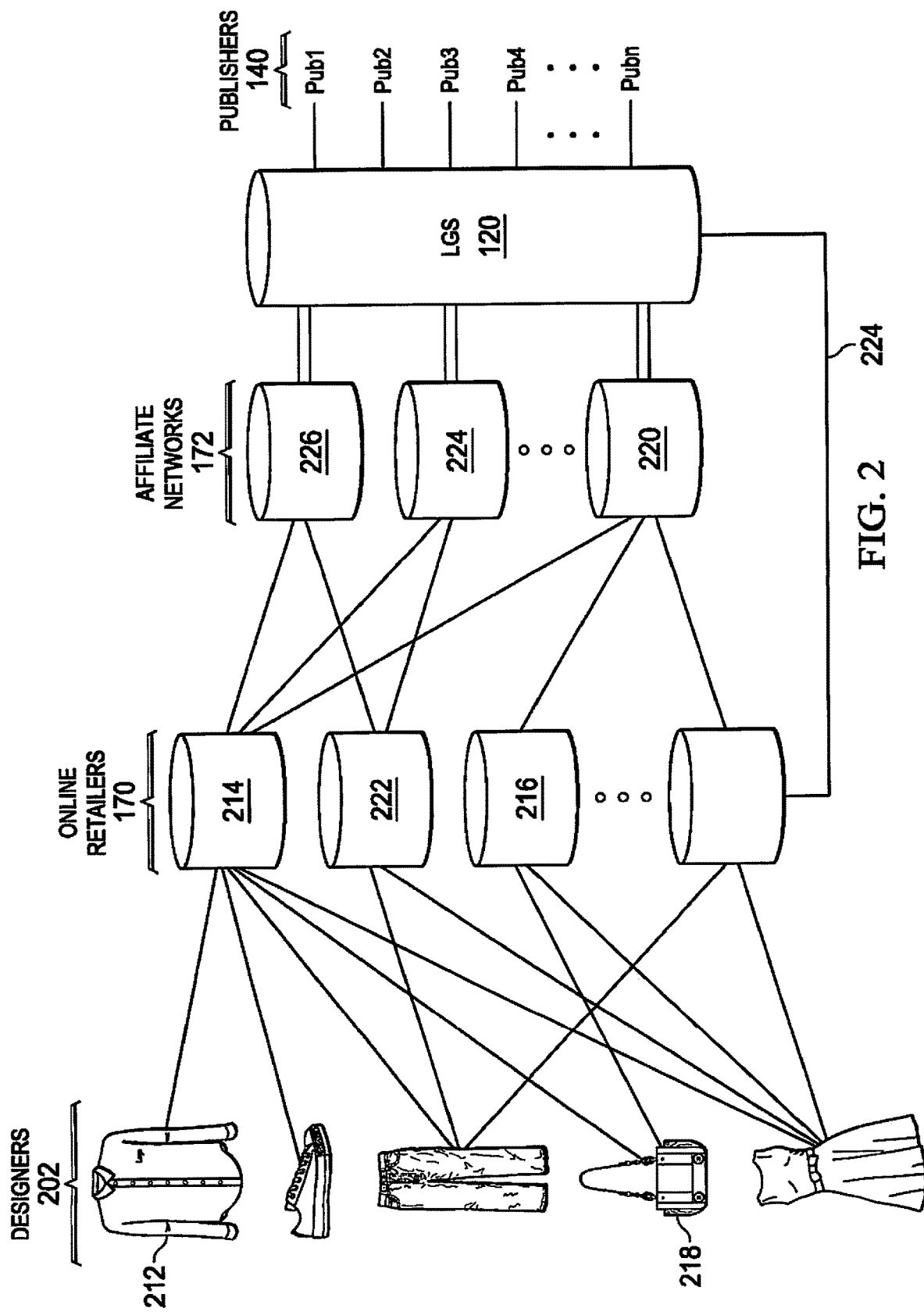
FIG. 2 is a relationship diagram highlighting the basic relationship connections among various elements that enable online sales utilizing the embodiments of the present disclosure.

FIG. 2 depicts a relationship diagram highlighting the basic relationship connections among various elements that enable online sales utilizing the embodiments of the present disclosure. As depicted, product designers and manufacturers 202 have relationships with online retailers (or advertising affiliates) 170, who market and oftentimes sell the designer/manufacturer 202 products. Relationships here may be varied. For example, a clothing designer 212 might have an exclusive relationship with a single advertising affiliate 214, while a handbag designer 218 might have relationships with multiple advertising affiliates (214 and 216).

Likewise, advertising affiliates 170 maintain relationships with affiliate networks 172, with some affiliates 170 having different levels of relationships with different affiliate networks 172. In general, retailers 170 typically have exclusive agreements with a particular affiliate network 172, allowing the affiliate network to handle its affiliate advertisements exclusively. However, other retailers 170 may maintain this exclusivity with a given affiliate network 172 by region, having multiple networks/regions. For example, a particular affiliate 214 might have stores in North America, Asia, and Europe; with the North American region represented by one affiliate network 226, the Asia region represented by another affiliate network 224, and the Europe region represented by yet another affiliate network 220. Different regions may have different product offerings, and while some products from a particular affiliate 170 may be available over multiple regions other products may only be available in a single region. The structure and interoperation of these relationships is well understood by one of ordinary skill in the relevant art and requires no additional explanation.

The link generation server 120 may also be registered with any number of affiliate networks 172. It is well understood that affiliate networks 172 provide affiliate network advertiser links to advertising affiliate 170 product webpages. Such affiliate network advertiser links allow for efficient tracking of online transactions related to affiliate network advertiser-linked products, which allows for the gathering of associated metrics for analytical and compensation purposes. For example, an affiliate network 172 can track metrics including page views, purchases, click-throughs, etc., for subsequent use in determining product popularity, inventory needs, demographic and geographic concentrations, etc. Tracking is possible because of the use of web browser cookies in conjunction with the affiliate network advertiser link syntax, which provides a link that when clicked on by a visitor redirects the visitor's browser through the affiliate network 172 servers and on to the affiliate 170 server where the product offering may be viewed.

However, because products and product availability frequently change, not every designer/manufacturer 202 product is present in the affiliate networks as an affiliate network advertiser link. For that reason, the link generation server 120 maintains relationships 224 directly with online retailers to allow for the dynamic creation of affiliate network affiliate network advertiser link URLs that function in substantially the same capacity as affiliate network 172 provided affiliate network advertiser links. These dynamically created affiliate network advertiser link URLs redirect a visitor through the link generation server 120, an affiliate network 172, and onto an advertising affiliate 170 webpage. Thus, tracking may occur at each point. The dynamically created affiliate network advertiser link URLs are provided to any number of publishers 140 for embedding of the link in a blog, posting, tweet, or any other online form of communication in which hyperlinks and webpage redirects may be utilized. Casual online visitors (for example, Internet users) typically access a publisher's embedded affiliate network advertiser link when, for example, the visitor encounters the embedded affiliate network advertiser link in the publisher's blog posting. Using common page redirects, cookies, and the like the link generation server 120 tracks the visitor's request and transaction through an affiliate network 172 and onto an affiliate 170 webpage. Because the link generation server 120 maintains relationships with a plurality of affiliate networks 120, it is possible for the link generation server 120 to provide and track more affiliate network advertiser links than the sum total of the affiliate networks 172 combined. Moreover, because the link generation server 120 algorithms allow affiliate network advertiser link URL creation regardless of an affiliate network's 172 affiliate network advertiser link syntax, it is possible for publishers to utilize the link generation server 120 to access any affiliate network 172 through a single hyperlink, either shortened or not shortened, without concern for the affiliate network advertiser link syntax. Thus, the operation of the link generation server 120 provides a publisher with consistent single source of affiliate network advertiser link URLs irrespective of the number of different affiliate networks that are involved. When shortened the affiliate network advertiser link URL includes no direct visual indication regarding the affiliate network to which the advertiser belongs.

In yet another embodiment is the arrangement in which the link generation server 120 is hosted directly on or by an affiliate network 172 server. In this embodiment an affiliate network 172 may have exclusive agreements with particular online retailers 170, and may still dynamically generate product link URLs for affiliates when the affiliate network does not have an exclusive agreement. For example, consider that the affiliate network 226 has an exclusive agreement with two online retailers 214 and 222. The affiliate network 226 may still provide dynamic product links to products offered by third party retailer 216 (and others) by using the link generation server described herein. One of ordinary skill will appreciate that given the modular nature of the computer system hardware upon which the system described herein operates, such an arrangement is inherent in the previous embodiments as disclosed and described.

Figure 3:
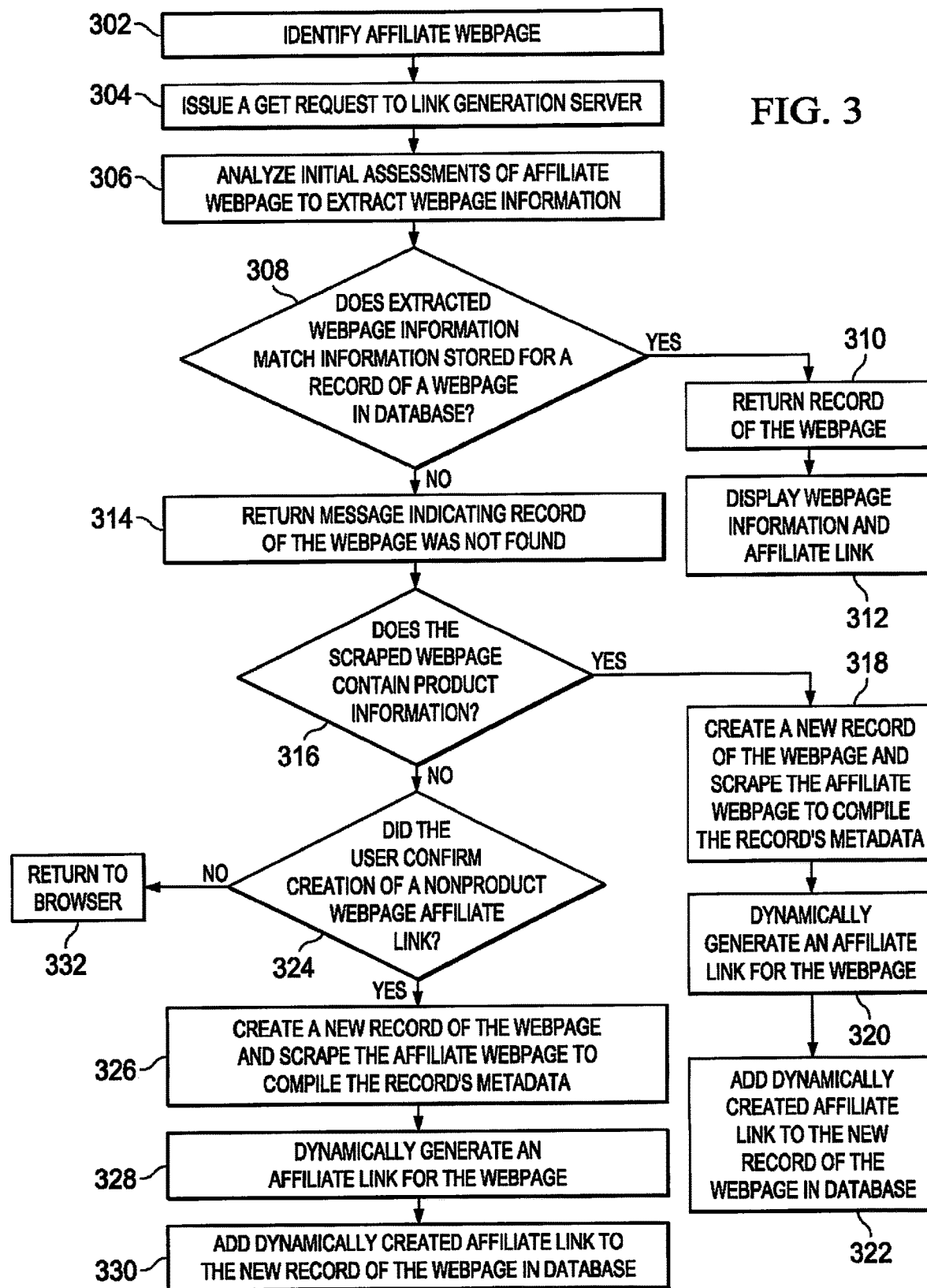
FIG. 3 is a somewhat simplified flow diagram illustrating a method of generating an affiliate link in accordance with one embodiment of the present disclosure.

FIG. 3 is a somewhat simplified flow diagram illustrating method of generating affiliate links according to one embodiment of the present disclosure. It should be understood that method shown in this figure is for illustrative purposes only and that any other suitable method or sub-method could be used in conjunction with or in lieu of the method according to an embodiment of the invention disclosed herein. It should also be understood that the steps of the method could be performed in any suitable order or manner unless specified otherwise.

In an embodiment, the method begins in step 302 with a publisher identifying an advertiser affiliate 170 webpage to integrate into the publisher's web post using online publisher 140 by clicking a system activator bookmarking button (i.e., a browser application, for example, a bookmark application or "bookmarklet") located on the bookmark bar on the online publisher's 140 web browser that executes an initialization JavaScript. The bookmarklet allows the JavaScript to be stored as the URL of a bookmark in the publisher's browser, to be activated by the publisher's user interface device ("mouse") click. The use of a bookmarklet allows the system to mask the complexity of the underlying link generation server 120 operation from the publisher.

The online publisher's 140 web browser then communicates the information to link generation server 120 by issuing a GET request through the communications network 160 using Bluetooth, Wi-Fi, infrared, text message, email, bump technology or by any other suitable manner, as shown in step 304. In another embodiment the publisher's 140 computing device utilizes a dedicated graphical user interface having menu bar buttons that provide similar connectivity.

Link generation manager 126 then analyzes and performs initial assessments of the affiliate webpage to extract webpage information, as shown in step 306.

In step 308, link generation manager 126 determines if the extracted webpage information in step 306 matches webpage information stored in one or more records in the system database device 180.

If link generation manager 126 determines the extracted webpage information matches webpage information stored in the database 180, the link generation server 120 returns the record of the webpage to online publisher 140 browser, as shown in step 310. This record includes webpage information and a related affiliate network advertiser link URL. If the webpage information stored in database 180 contains detailed product information, link generation server 120 will either display the product picture on the publisher's 140 display 142 or prompt the publisher to select a product picture through the input 144 means. In one embodiment, the product picture is displayed as a result of parsing (scraping) the parent HTML document (product webpage) and finding an image.

In this embodiment the link generation server 120 will then create a loader inline frame ("iframe") that creates a final iframe containing the scraped webpage information and the affiliate link. Link generation server 120 will communicate the webpage information and the network affiliate advertiser link URL to the online publisher 140, as shown in step 312. Given the excessive length of the typical affiliate network advertiser link URL (see FIG. 5), the link generation server may provide the publisher, instead, with a shortened link that the system uses to access the full link. The publisher may then copy and paste the network affiliate network advertiser link URL (shortened link) to a blog post or other online publication. In another embodiment the affiliate network advertiser link URL is not shortened, but is provided in full length to the publisher.

Frames allow a visual HTML Browser window to be split into segments, each of which may show a different document. An iframe places yet another HTML document in a frame inside the original parent document. Unlike an object element, an inline frame can be the "target" frame for links defined by other elements and can be selected by the publisher as the focus for printing or viewing its source.

In one embodiment, communication between the JavaScript attached to the parent page and the iframe is implemented with the use of easyXDM. EasyXDM is a JavaScript library that enables a system to easily work around the limitation set in place by the Same Origin Policy, in turn making it easy to communicate and expose the JavaScript Application Programming Interface (API) across domain boundaries. EasyXDM provides a transport stack capable of passing string-based messages between the consumer and the provider. The transport stack offers bi-directionality, reliability, queuing and sender-verification and does not violate browser security policy since the connection is only established once and only simple plain text messages can be sent across the frames. The one-time connection setup is enforced by easyXDM library to lock the connection down to avoid spoofing attacks. One of ordinary skill in the art will appreciate and understand that the use of iframes is a programming implementation choice for the aforementioned reasons. Other embodiments may utilize less secure commonly understood socket-based communications means for passing product information and affiliate network advertiser URL links to a publisher's web browser if security is not a concern.

If link generation manager 126 determines the extracted webpage information does not match webpage information stored in the database 180 (i.e., no record exists), the link generation server 120 will return a message indicating the webpage was not found and presenting a request for additional webpage-related information from the publisher through display 142, as shown in step 314.

In step 316, link generation server 120 will scrape (parse) the webpage data to determine if product information may be ascertained. One of ordinary skill in the art will appreciate and understand that the process of scraping a webpage for information is commonly understood and practiced.

If link generation server 120 ascertains product information from the scraped webpage, link generation server 120 will create a new record of the product and compile at least a relevant portion of the record's metadata from the scraped webpage, as shown in step 318.

In step 320, link generation server 120 will dynamically create an advertiser affiliate link for the webpage.

Figure 4:
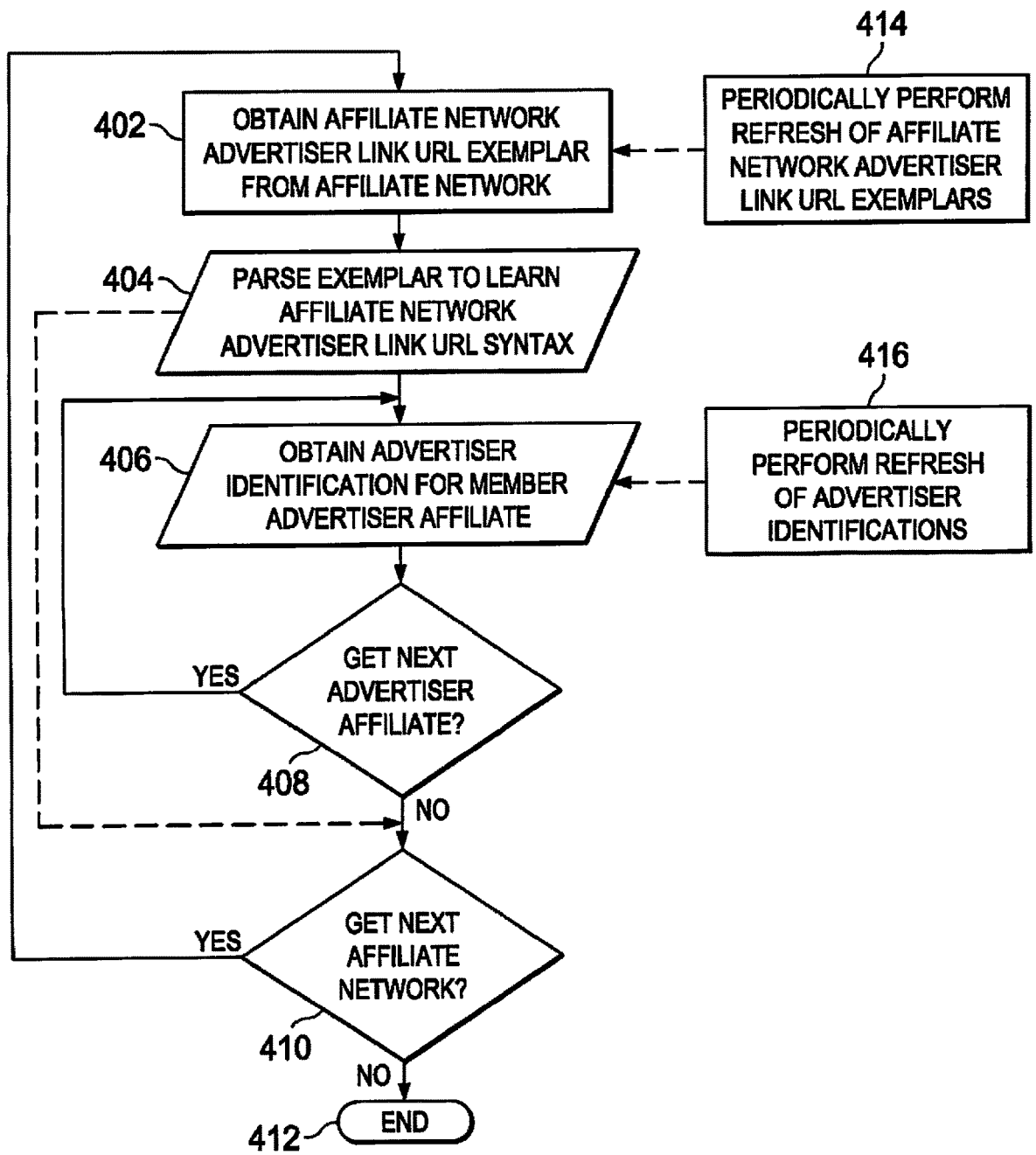
FIG. 4 is a flow diagram depicting steps taken by the embodiment to facilitate automatic creation of an affiliate network advertiser link URL.

FIG. 4 is a flow diagram depicting steps taken by the embodiment to facilitate automatic creation of an affiliate network advertiser link URL in the embodiment. To begin, the link generation server 120 processor obtains at least one affiliate network advertiser link URL exemplar for each advertiser from each of the affiliate networks 172 with which it maintains a relationship, as shown in step 402. Because of the lack of standardization, the elements chosen by a given affiliate network to encode its affiliate network advertiser link URL may vary from other affiliate networks. As such, it is necessary to consider each. Each exemplar is then parsed by the link generation server 120 to determine the exact syntax chosen by a given affiliate network 172, as shown in step 404. The affiliate networks 172 also make available the advertiser ID's that are unique to the advertiser affiliate 170 members. Because each affiliate network 172 has multiple affiliate 170 member advertisers, the processing iterates through the listing, as shown in step 408. By parsing a plurality of affiliate network advertiser link URL exemplars it is possible to determine which portions of the link remain consistent between advertiser affiliates (the affiliate network advertiser link URL syntax), which portion reflects the advertiser ID, and which portion reflects the advertiser webpage URL data. Likewise, because the link generation server maintains relationships with multiple affiliate networks 172, it is necessary to iterate through each advertiser on each affiliate network to obtain the advertiser ID's for each advertiser, as shown in step 410, to ensure complete coverage. Once the link generation server learns of the affiliate network 172 advertiser link URL syntax and the affiliate 170 member advertiser ID's, it retains this information for subsequent dynamic affiliate link creation. To ensure that this information remains fresh, the system may also periodically perform this affiliate network advertiser link URL exemplar analysis on a predetermined schedule, for example, daily, as in step 414. Further, because advertiser affiliates 170 often change, which results in a change in the advertiser ID's supported by a given affiliate network 172, it may be desirable to perform a periodic refresh of the advertiser ID's as in step 416. In the embodiment in which the link generation server 120 is hosted by an affiliate network, the link generation server 120 still obtains the same advertiser link URL exemplars as above from the affiliate networks 172 with which it maintains a relationship. Thus, this embodiment understands not only its own affiliate product link URLs, but also the syntax necessary to recreate other affiliate network 172 advertiser product link URLs.

Figure 5C:
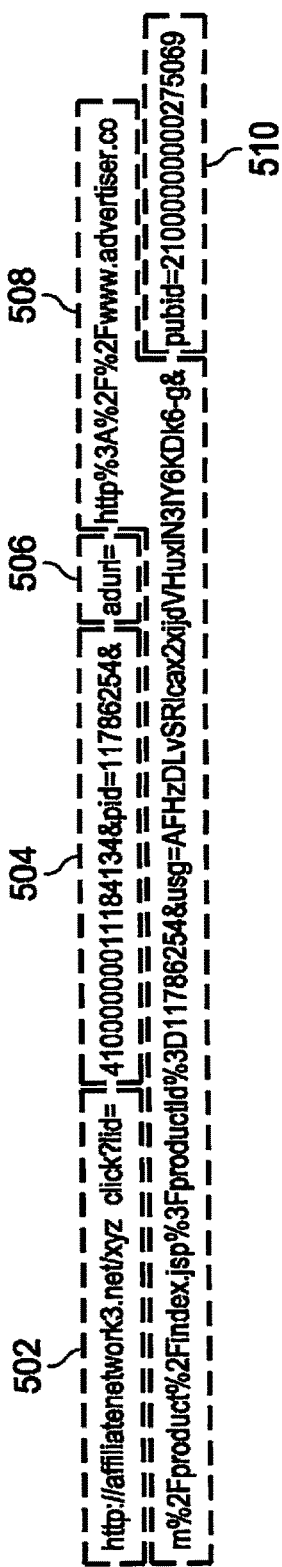
FIG. 5C depicts the syntax of a typical affiliate network advertiser link URL exemplar for fictional affiliate network "AffiliateNetwork3.com," highlighting additional variables and placeholders utilized by redirection scripts.
Figure 6C:
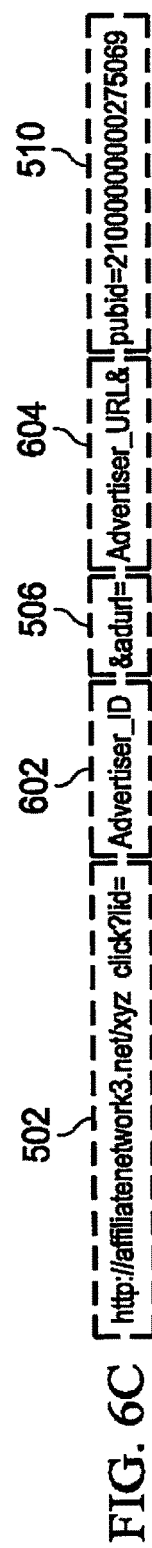
FIG. 6C depicts the parsed syntax of the affiliate network advertiser URL exemplar for fictional affiliate network "AffiliateNetwork3.com," highlighting the various identified parameters.

FIG. 5 depicts the syntax of a few typical affiliate network advertiser link URL exemplars, while FIG. 6 depicts the resulting parsed syntax, highlighting the various renamed parameters as variables for the link generation server 120 to populate. A shown in FIG. 5A, the affiliate network advertiser link begins with the URL of the affiliate network 502 (in this instance, "AffiliateNetwork1.com") and includes additional variables and placeholders utilized by its redirect scripts. Within this string of variables is the advertiser ID 504 followed by additional redirect variables 506 and finally, the advertiser webpage URL 508. FIG. 6A depicts the results. As shown, the link generation server 120 records the affiliate network advertiser link URL and necessary variables and placeholders 502 and 506, and isolates an advertiser ID parameter 602 and advertiser webpage URL parameter 604 for subsequent substitution during dynamic affiliate network advertiser link creation.

FIG. 5B depicts yet another affiliate network advertiser link URL exemplar. The link generation server 120 parses the URL text to isolate the affiliate network URL 502 (in this instance, "AffiliateNetwork2"), the advertiser ID 504, the additional redirect variables 506, and the advertiser webpage URL 508. The resulting affiliate network advertiser link URL syntax is shown in FIG. 6B, which again provides for an advertiser ID parameter 602 and advertiser webpage URL parameter 604. The link generation server 120 substitutes an advertiser ID and advertiser URL for these parameters during affiliate network advertiser link creation for this affiliate network.

FIG. 5C depicts a affiliate network advertiser link URL exemplar from the "AffiliateNetwork3" affiliate network, which utilizes an even greater amount of information with its affiliate network advertiser link URLs. In addition to the affiliate network URL 502, the advertiser ID 504, additional redirect variables 506, and the advertiser webpage URL 508, this affiliate network attaches the publisher ID 510. The resulting syntax of 6C shows the addition of the publisher ID 510 appended to the advertiser webpage URL parameter 604. The link generation server knows the publisher ID based upon the publisher's user account information.

Figure 5D:
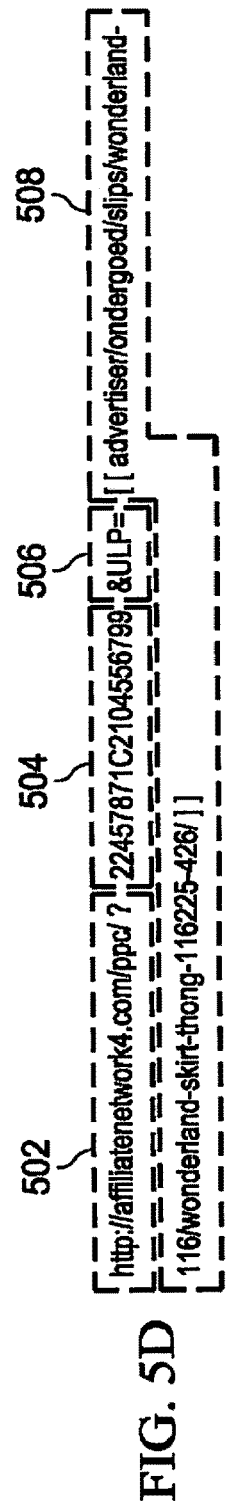
FIG. 5D depicts the syntax of a typical affiliate network advertiser link URL exemplar for fictional affiliate network "AffiliateNetwork4.com," highlighting additional variables and placeholders utilized by redirection scripts.
Figure 6D:
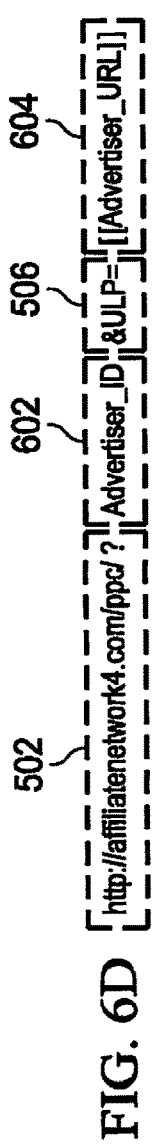
FIG. 6D depicts the parsed syntax of the affiliate network advertiser URL exemplar for fictional affiliate network "AffiliateNetwork4.com," highlighting the various identified parameters.

FIG. 5D depicts a affiliate network advertiser link URL exemplar from the "AffiliateNetwork4" affiliate network. As shown, this exemplar includes the affiliate network URL 502, the advertiser ID 504, additional redirect variables 506, and the advertiser webpage URL 508 like the others. However, the advertiser webpage URL includes additional brackets that frame the webpage link data. Accordingly, the resulting syntax includes the advertiser ID 602 and advertiser webpage URL parameter 604 as before, along with the extra bracket characters as depicted in FIG. 6D.

Figure 7:
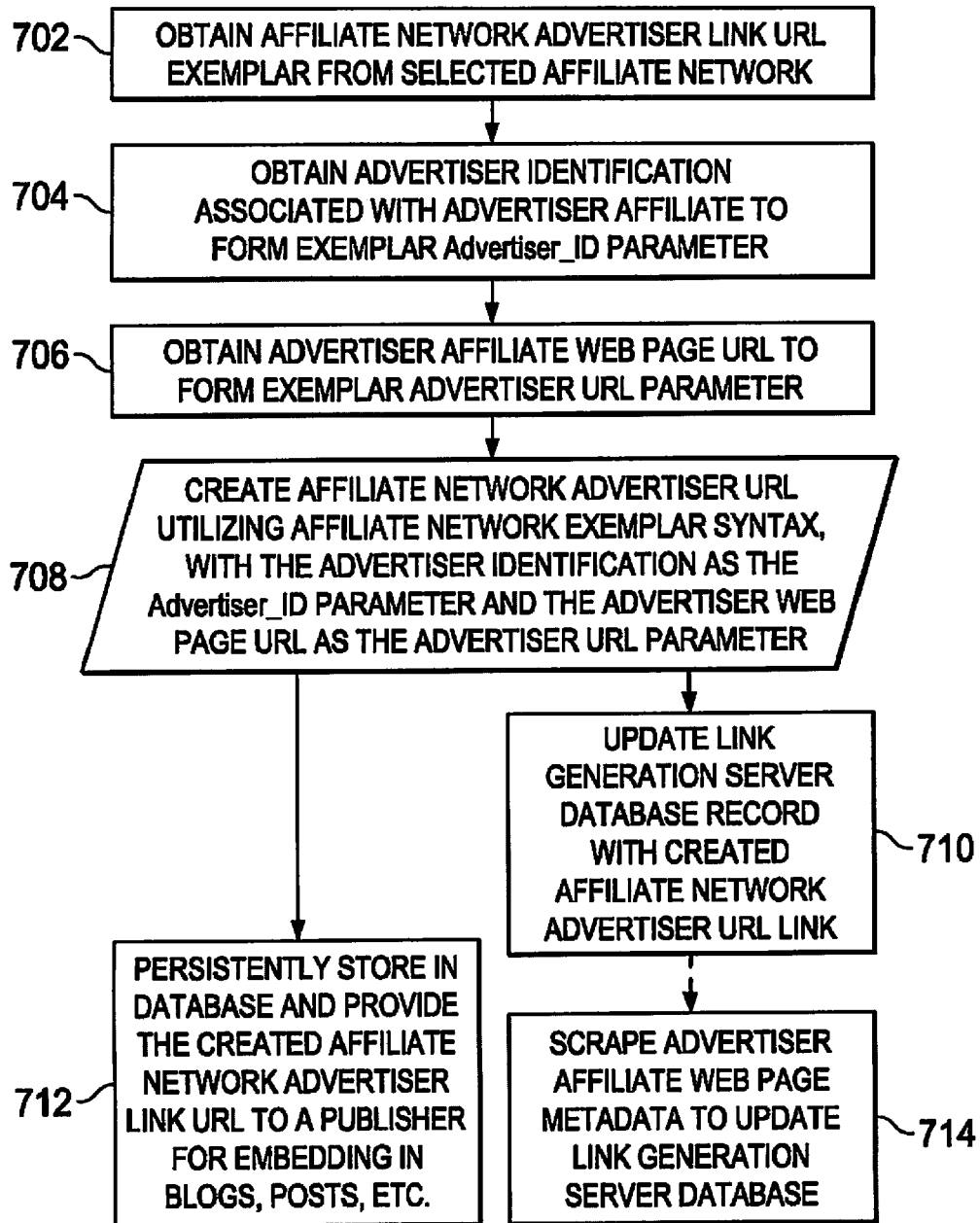
FIG. 7 is a flow diagram depicting steps taken by the embodiment to dynamically create an affiliate network advertiser link URL.

FIG. 7 is a flow diagram depicting steps taken by the embodiment to dynamically create an affiliate network advertiser link URL after the exemplar syntax is obtained. When necessary to create an affiliate network advertiser link URL (i.e., the publisher identified webpage is new and no affiliate network 172 page data exists), the link generation server 120 processing obtains the chosen affiliate network's exemplar information regarding the previously identified advertiser ID 602 and advertiser URL parameter 604, as shown in step 702. The advertiser ID associated with the webpage's advertiser affiliate 170 is also obtained (step 704) along with the affiliate's advertiser webpage URL (step 706) and this information is substituted for the advertiser ID parameter 602 and advertiser URL parameter 604 to form the affiliate network advertiser link URL (step 708). This dynamically formed affiliate network advertiser link is then provided to the publisher's web browser (step 712) as previously mentioned (typically in the form of a shortened link, but possibly in the form of a standard link) and saved in the system database (step 710) along with the advertiser webpage data (step 714) if necessary or desirable, which may contain product and advertiser related data. In the situation in which the publisher requests an affiliate network advertiser link to an advertiser's homepage or non-product webpage as opposed to a particular advertised product webpage, the advertiser's homepage or non-product webpage URL is used as the advertiser URL parameter 604.

Referring once again to FIG. 3, in step 322, the new record of the webpage and affiliate link dynamically created in step 320 will be added to database 180 for use by a plurality of online publishers 140. The link generation server 120 may share this dynamically created affiliate link with the affiliate network 172 or it may be retained for use solely by the link generation server 120 system in its communications with publishers 140. This pass-through of the page redirects to a given advertiser affiliate's advertiser webpage allows the link generation server 120 and the affiliate network 172 to track web metrics associated with transactions involving the dynamically created affiliate network advertiser link.

If link generation server 120 ascertains that product information cannot be scraped from the webpage (i.e., no identifiable product information exists), link generation server 120 will prompt the publisher to confirm creation of a non-product webpage affiliate link, as shown in step 324. If the publisher confirms creation of a non-product page affiliate link, link generation server 120 will create a new record of the webpage and compile the record's metadata from the scraped non-product Webpage, as shown in step 326.

In step 328, link generation server 120 will dynamically create an affiliate network advertiser link for the webpage as previously described.

In step 330, the new record of the webpage and affiliate link dynamically created in step 320 will be added to database 180 for use by a plurality of online publishers 140.

If the publisher does not confirm creation of a non-product page affiliate link, link generation server 120 will return the publisher to the browser screen, as shown in step 332, and no affiliate link will be created.

Again, as previously discussed using FIG. 3, advertisers 170 may have relationships with multiple affiliate networks 172, with each network 172 handling a particular region of commerce. For example, one such advertiser might have stores in the United States and in Europe, with one affiliate network ("network1") handling its online product sales affiliate tracking and publishers relationships in the U.S. region and another affiliate network ("network2") handling its online product sales affiliate tracking and publisher relationships in the European region. Thus, ideally, purchase inquiries originating from the U.S. should be properly handled by network1 while purchase inquiries originating from Europe should be properly handled by network2. In reality, however, publishers are able to browse for and link directly (i.e. without the use of affiliate links) to product offerings across all advertising regions and website visitors are able to visit all advertising regions for a given online retailer because of the global reach of the Internet. Thus, a publisher in France might locate and link to a particular pair of shoes discovered while browsing a U.S. advertiser's website, where the shoes are available in the U.S. and France and handled by two different affiliate networks. If a publisher publishes an affiliate link online using this U.S. advertiser link and a visitor purchases these shoes on the US website through a U.S. affiliate network regional link, tracking will remain intact and the publisher will earn a commission. If visitor adjusts the advertiser website settings to be routed to a French website in order to purchase the shoes, the affiliate network handling U.S. website region will not be able to track analytics on the French website. In the absence of a geographic based affiliate network redirect system visitors to advertiser's website through a publisher's U.S. affiliate product link originating from France will be directed to the French website and all tracking will cease due to incompatible product/affiliate network advertiser link URLs, rendering all analytics and potential commission earnings to publisher lost. Another embodiment of the system provides a clean method for handling such scenarios to ensure cross network/geography analytics and conversions tracking.

Figure 8:
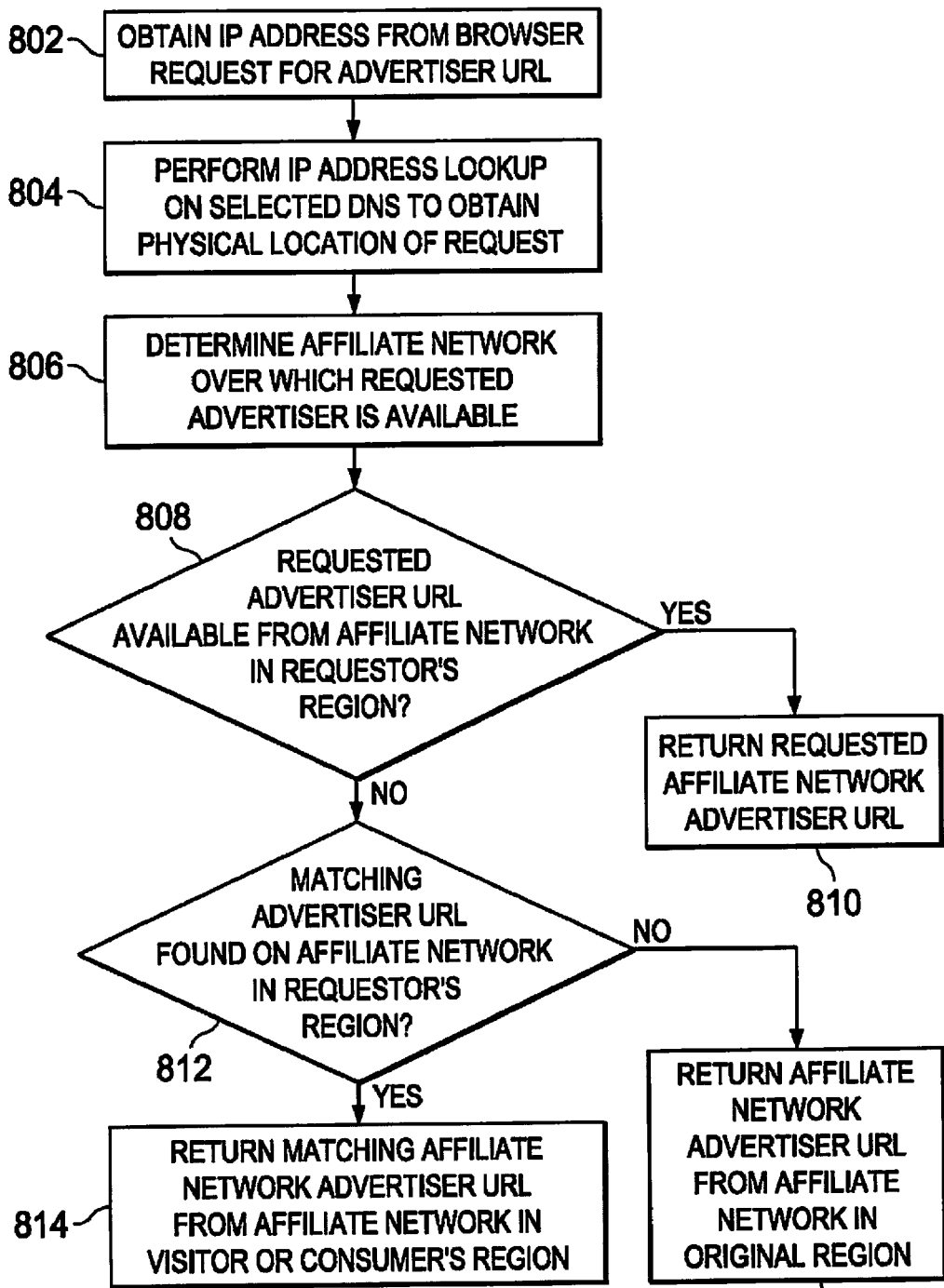
FIG. 8 is a flow diagram depicting steps taken by an embodiment in determining the proper affiliate network advertiser URL to redirect the visitor/consumer to the proper online advertiser regional site based upon the visitor/consumer's physical location.

FIG. 8 is a flow diagram depicting steps taken by this other embodiment in determining the proper affiliate network advertiser link URL to redirect the visitor/consumer to the proper online advertiser regional site based upon the visitor/consumer's physical location and maintaining proper URL syntax to ensure analytics and any conversions are properly tracked, commissionable, and payable to publisher. As shown, once the visitor/consumer submits a request to visit an advertiser URL by clicking on an affiliate network advertiser link using the system obtains the requesting web browser's IP address 802. The region in which the visitor/consumer resides may then be determined by performing a lookup on a domain name server (DNS) using the browser's IP address 804. Once the visitor/consumer's region is determined, the link generation server 120 system locates the affiliate network over which the requested advertiser URL is available 806. If the requested advertiser URL is from an affiliate network in the requestor's region 808, the visitor is directed to the requested advertiser URL webpage through the original affiliate network advertiser link 810. If, however, the requested advertiser URL is from an affiliate network outside the requestor's region, the system looks for a match to the requested advertiser product or webpage URL on affiliate networks in the requestor's region 812. If a match is located, the visitor is directed to the matching affiliate network advertiser webpage URL in the requestor's region 814. If, however, no match is located, the system directs the visitor to the affiliate network advertiser webpage URL from the affiliate network associated with the original request 816.

Figure 9:
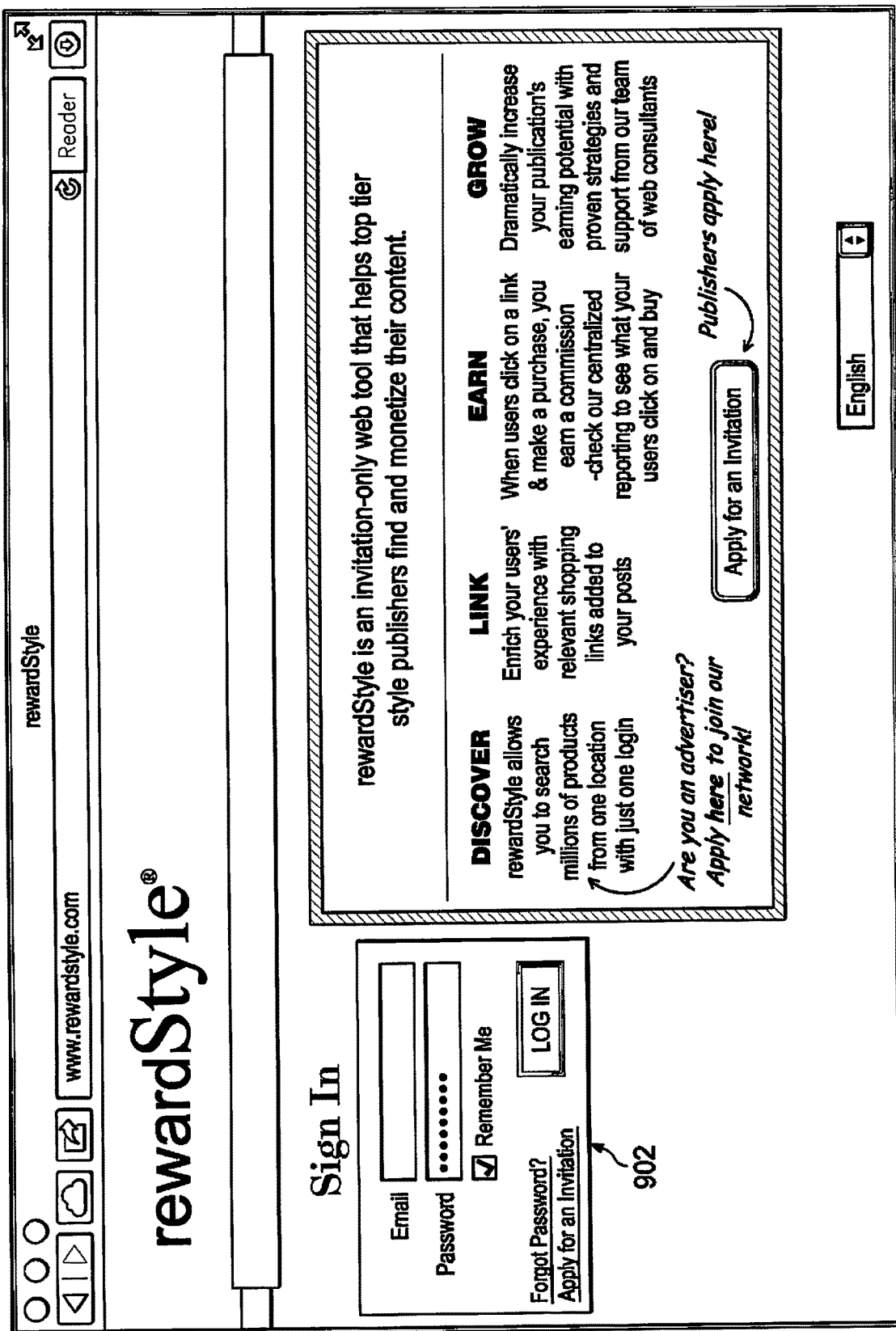
FIG. 9 depicts a screen image of a user interface for allowing a registered publisher access to the embodiment of the present disclosure.

Various embodiments of the user interface for access to the system described herein are possible. For example, FIG. 9 depicts a screen image of a user interface for allowing a registered publisher access to the embodiment of the present disclosure. A publisher 140 creates an account to access the link generation server 120 system. Secure sign-in 902 allows the publisher to gain access to the system's full capabilities. Once logged-in to the system the publisher is presented with the option to edit its account information. FIG. 10 depicts a screen image of a user interface to allow the publisher to manipulate stored publisher account data 1002. Basic information includes name, contact information, blog information, and escrow service account information for the handling of commissions generated through link transactions.

Figure 11:
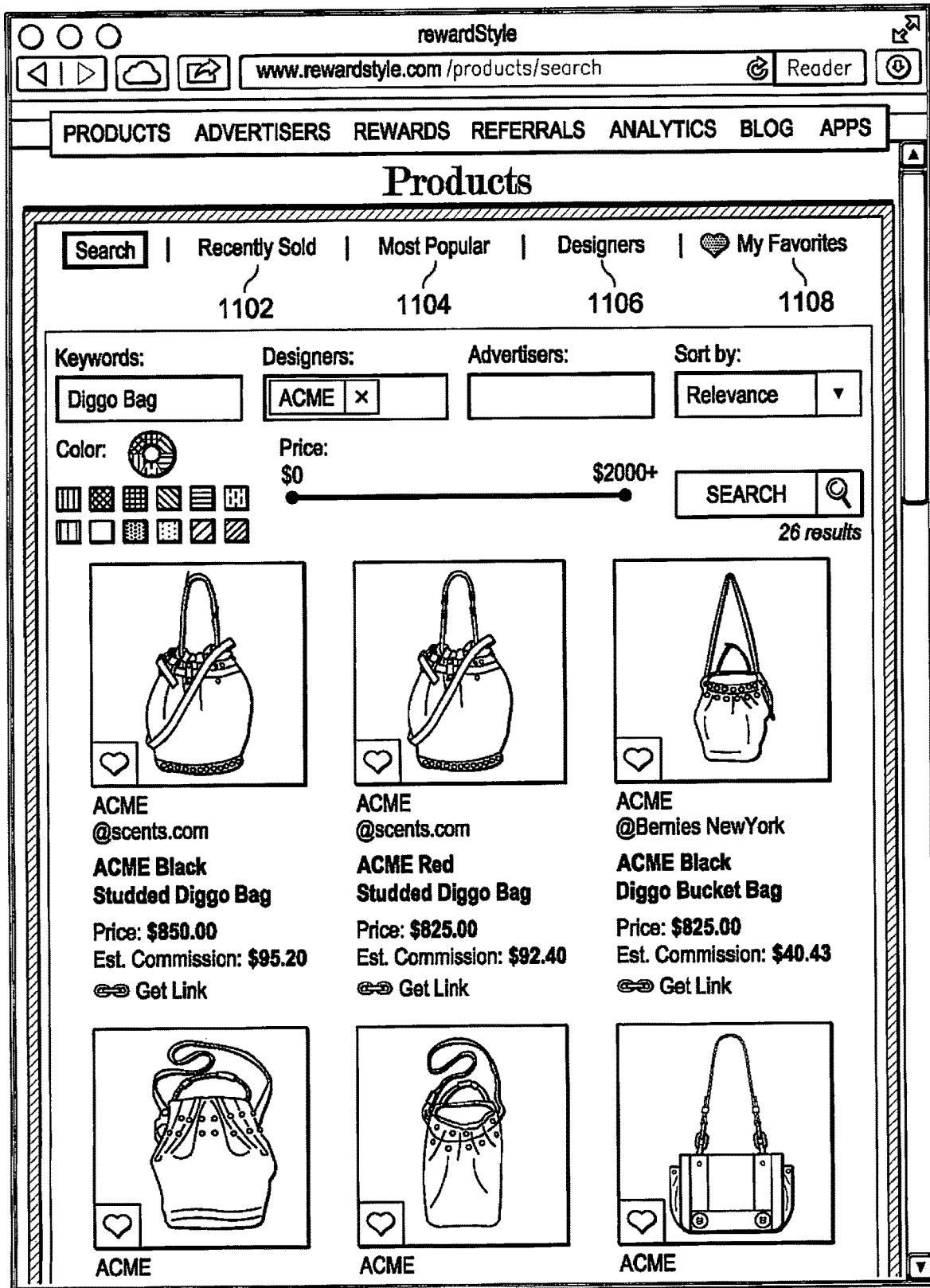
FIG. 11 depicts a screen image of a user interface that presents the publisher a listing of the products stored within the system database, along with each product's associated estimated commission rate.

FIG. 11 depicts a screen image of a user interface that allows the publisher to perform a search of the products stored within the system database. As shown, link generation server 120 product records are arranged and presented based upon metrics gathered by the server 120. For example, a publisher may filter the product records based upon sales count 1102, popularity 1104, designer name 1106, or may even maintain a list of personal favorites 1108. Thus, through this interface a publisher 140 can review the products based upon the desired criteria, determine the approximate commission each advertiser offers for the given product, and obtain affiliate network advertiser link URLs for products directly from this page for posting on a blog. Use of this interface provides convenience for a publisher as it precludes the need to visit numerous advertiser affiliate 170 websites in search of products to post.

Various advertisers offer commissions for sales of their products, or for various transactions associated with the products. By facilitating a transaction, a publisher may earn at least a portion of the commission from the advertiser, with a portion shared with the link generation server and the affiliate network if involved as well. A listing of supported advertisers is also provided by the system to allow a publisher to focus its consideration on supported advertiser affiliates only.

Over time a publisher that is publishing affiliate network advertiser link URLs provided by the present embodiment will earn commissions on transactions related to the URLs. FIG. 12 depicts a screen image of a user interface presenting the publisher with a summary of the amount of commissions generated through transactions 1202 facilitated by affiliate links created and provided by the embodiment of the present disclosure.

Figure 13:
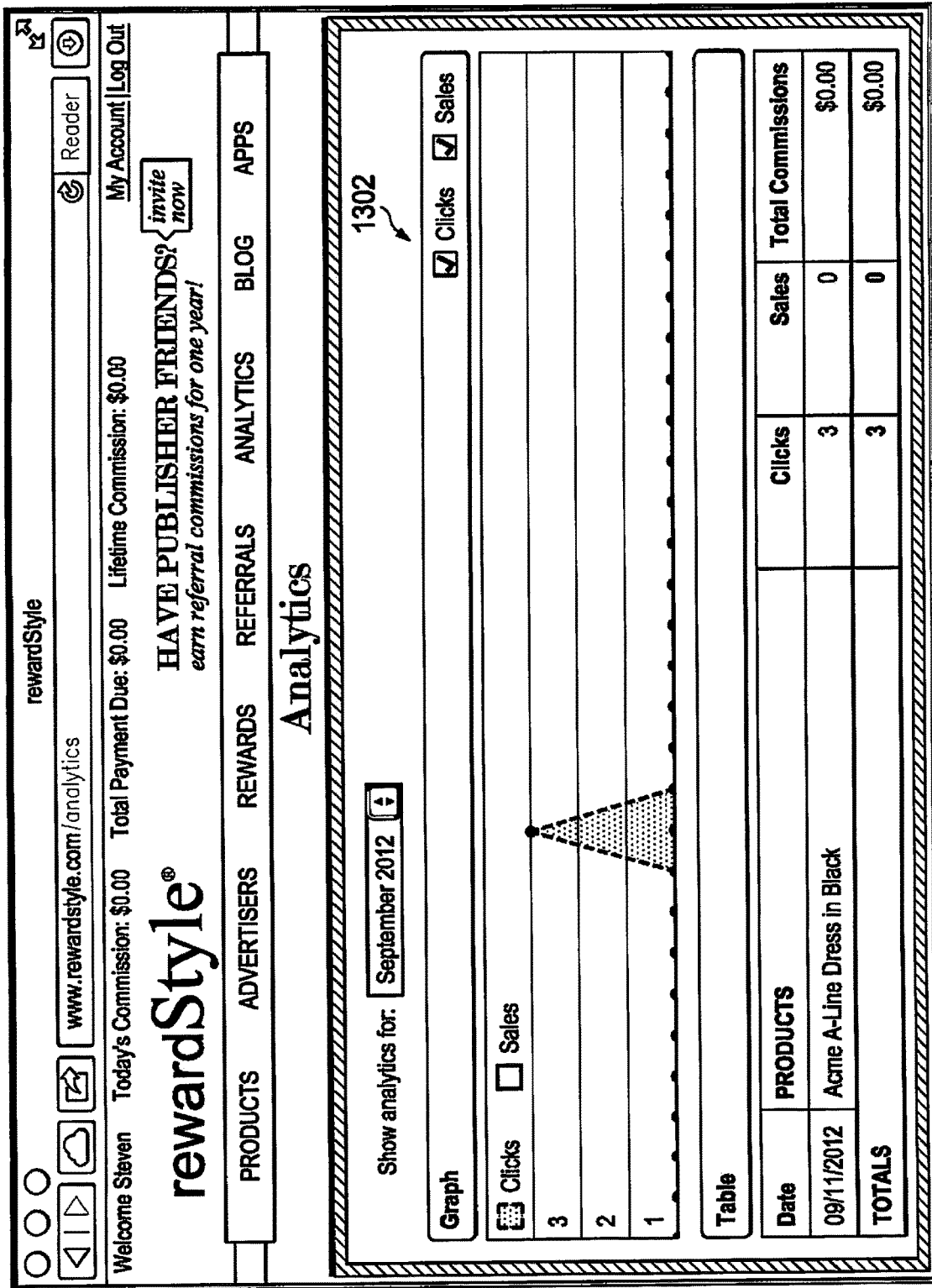
FIG. 13 depicts a screen image of a user interface presenting the publisher with analytics involving the publisher's use of an affiliate network advertiser URL in addition to affiliate network advertiser links available in the affiliate network's inventory database.

As mentioned previously, the primary reason for the affiliate network advertiser link creation of products and non-product webpages is to allow the collection of web metrics concerning products, product transactions, and casual visitor behaviors with regard to same. FIG. 13 depicts a screen image of a user interface presenting the publisher with historical network analytics involving the publisher's use of an affiliate network advertiser link URL 1302. This information allows a publisher to consider the worth of each of the affiliate links used in its publications, and to modify such publications accordingly.

Figure 14:
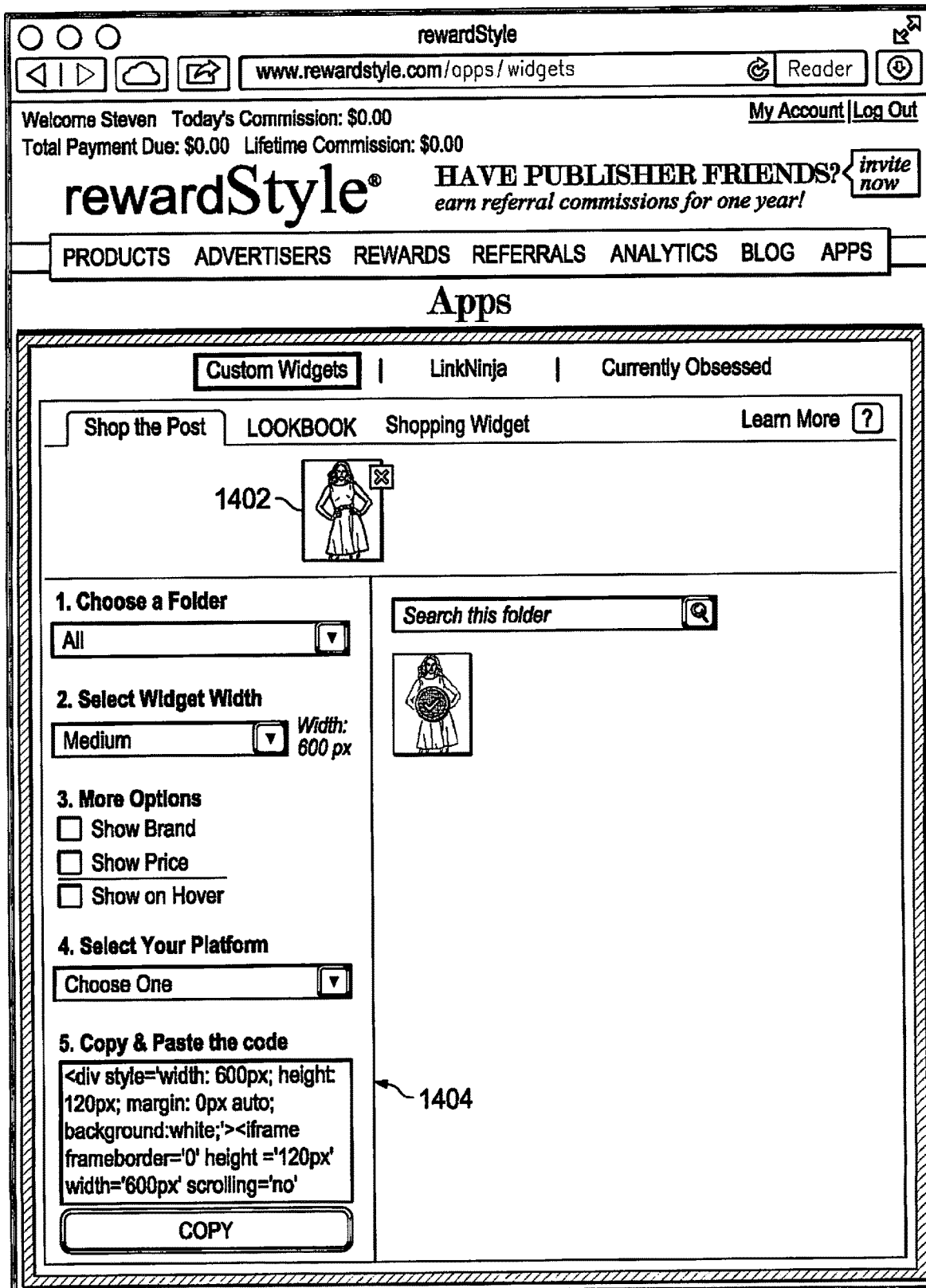
FIG. 14 depicts a screen image of a user interface presenting the publisher with widget apps utilizing the affiliate network advertiser link URL in addition to affiliate network advertiser links available in the affiliate network's inventory database, and made available by the system of the present embodiment.

FIG. 14 depicts a screen image of a user interface presenting the publisher with widget apps utilizing the affiliate network advertiser link URL and made available by the system of the present embodiment. As shown, the system provides publishers with widgets for embedding in the publisher's blog posts. For example, the depicted shopping widget is an embeddable iframe for incorporation into an HTML document to allow multiple affiliate link URLs and corresponding advertiser or product images to be scrolled horizontally, thereby saving document real estate. An image of the widget is provided 1402, along with the actual HTML code 1404 that the publisher may copy-and-paste to add the depicted widget functionality to its HTML document.

Figure 15:
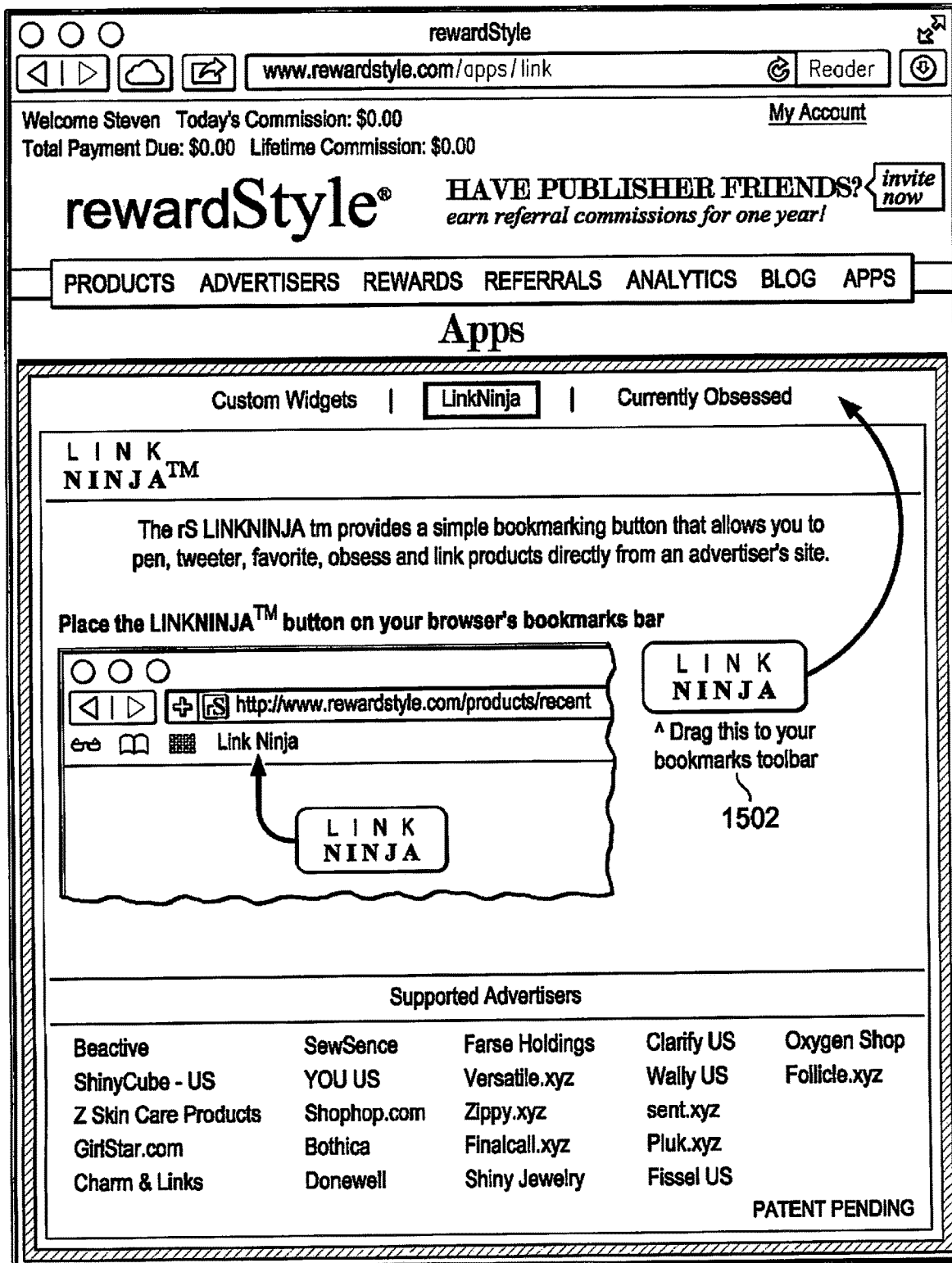
FIG. 15 depicts a screen image of a user interface presenting the publisher with a bookmarking tool to facilitate automatic creation of the affiliate network advertiser link URL in addition to affiliate network advertiser links available in the affiliate network's inventory database.

FIG. 15 depicts a screen image of a user interface presenting the publisher with a bookmarking tool to facilitate automatic creation of the affiliate network advertiser link URL. In this embodiment, it is possible for a publisher to select the bookmarking tool button 1502 and merely drag the selected button 1502 to the publisher's web browser bookmark bar. In so doing, the bookmarking tool embeds JavaScript functionality into the bookmark bar button that, on selection, initiates the affiliate network advertiser link URL creation described above.

Figure 16:
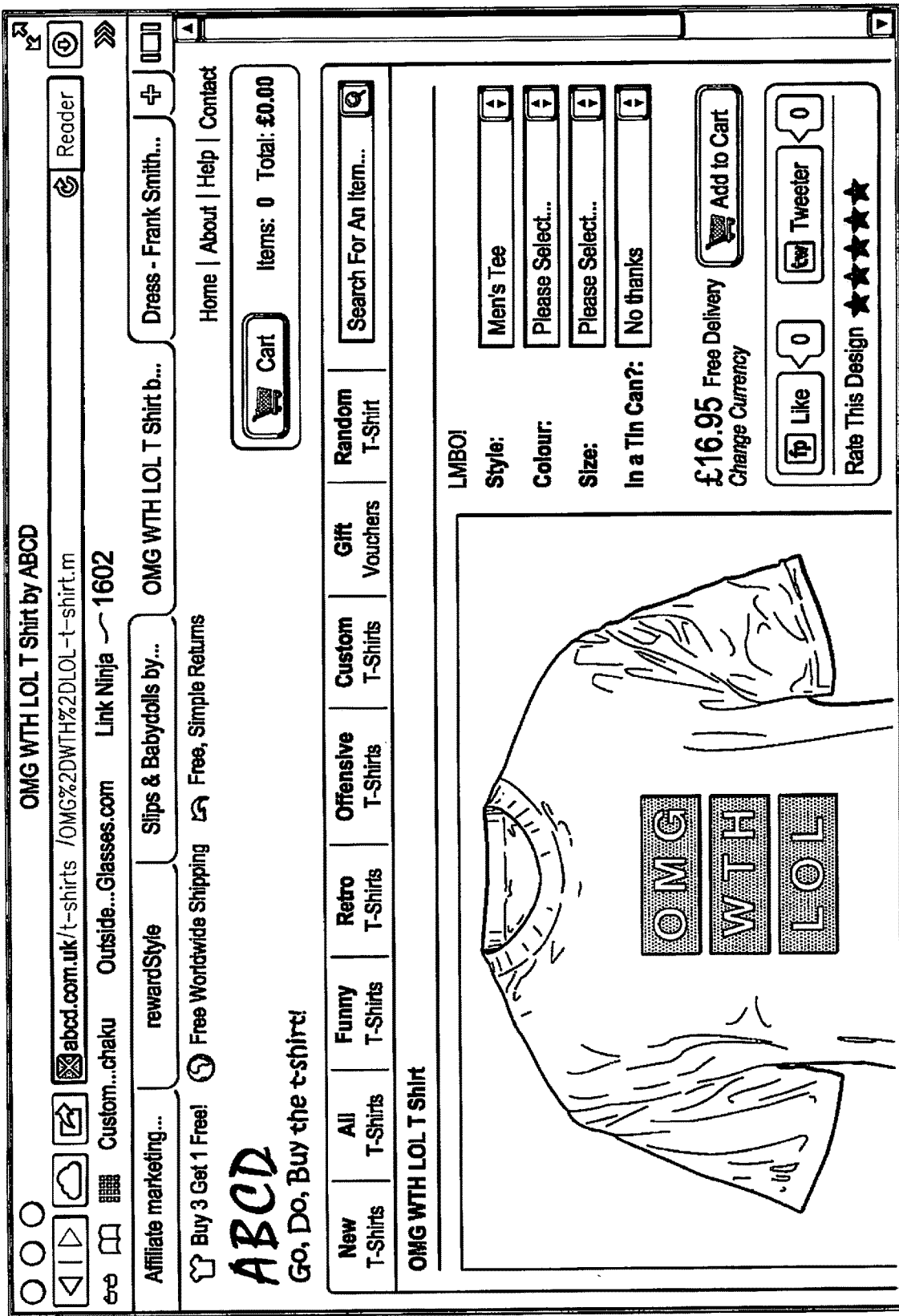
FIG. 16 depicts a screen image of an advertiser affiliate product webpage belonging to an advertiser affiliate that is a member of an affiliate network that is accessible by the system of the present embodiment.

After the bookmarking tool is embedded in the publisher's web browser bookmark bar, it may be used to trigger the functionality of the embodiment. If the publisher does not want to utilize the search product result pre-selected and filtered links provided in FIG. 11, he or she may browse advertiser affiliate websites to locate products. FIG. 16 is a screen image of an advertiser affiliate product webpage belonging to an advertiser affiliate 170 that is a member of an affiliate network 172 that is accessible by the present embodiment. As an example, if a publisher were interested in blogging about the product depicted, he or she would select the bookmarking button 1602 on the bookmark bar. In the instance depicted, selection of the button 1602 would yield the interface as depicted in FIG. 17.

Figure 17:
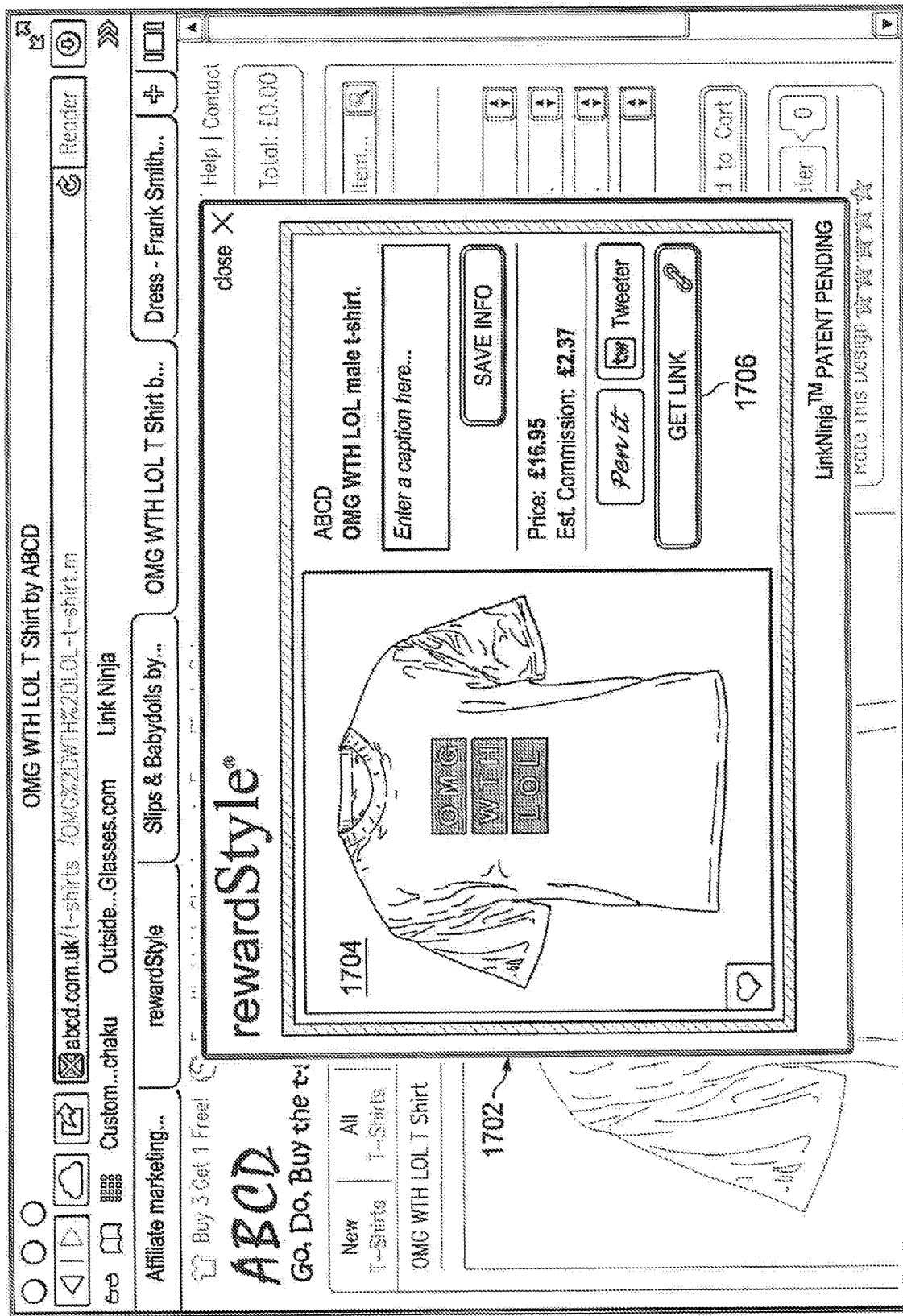
FIG. 17 depicts a screen image of a user interface message box notifying the publisher that the advertiser affiliate webpage contains product information and that a record exists in the system database.

FIG. 17 depicts a screen image of a user interface message box notifying the publisher that the advertiser affiliate webpage contains product information and that a record exists in the link generation server 120 system database 180. As depicted, an iframe 1702 is presented to the publisher, containing product data including an image of the product 1704 and a button for obtaining an affiliate network advertiser link URL 1706. Selection of the link button 1706 causes the link generation server to produce, using the previously described algorithms, an affiliate network advertiser link URL in text format that the publisher can copy-and-paste into a blog posting, a Tweet, Facebook posting, or similar social networking publication, with the goal that their posting will generate interest in the product or advertiser by a reader of the post who will then make a purchase that will generate a commission payment to the publisher. Alternatively, the publisher can publish the generated advertiser link URL directly to an external application, for example, Twitter, Facebook, Pinterest, Tumbler, or another such social networking blog or application as shown. The publisher may also wish to "favorite" the generated link (see also FIG. 11, 1108) to save the generated link and associated product and webpage metadata in a favorites list or repository for subsequent review and use.

Figure 18:
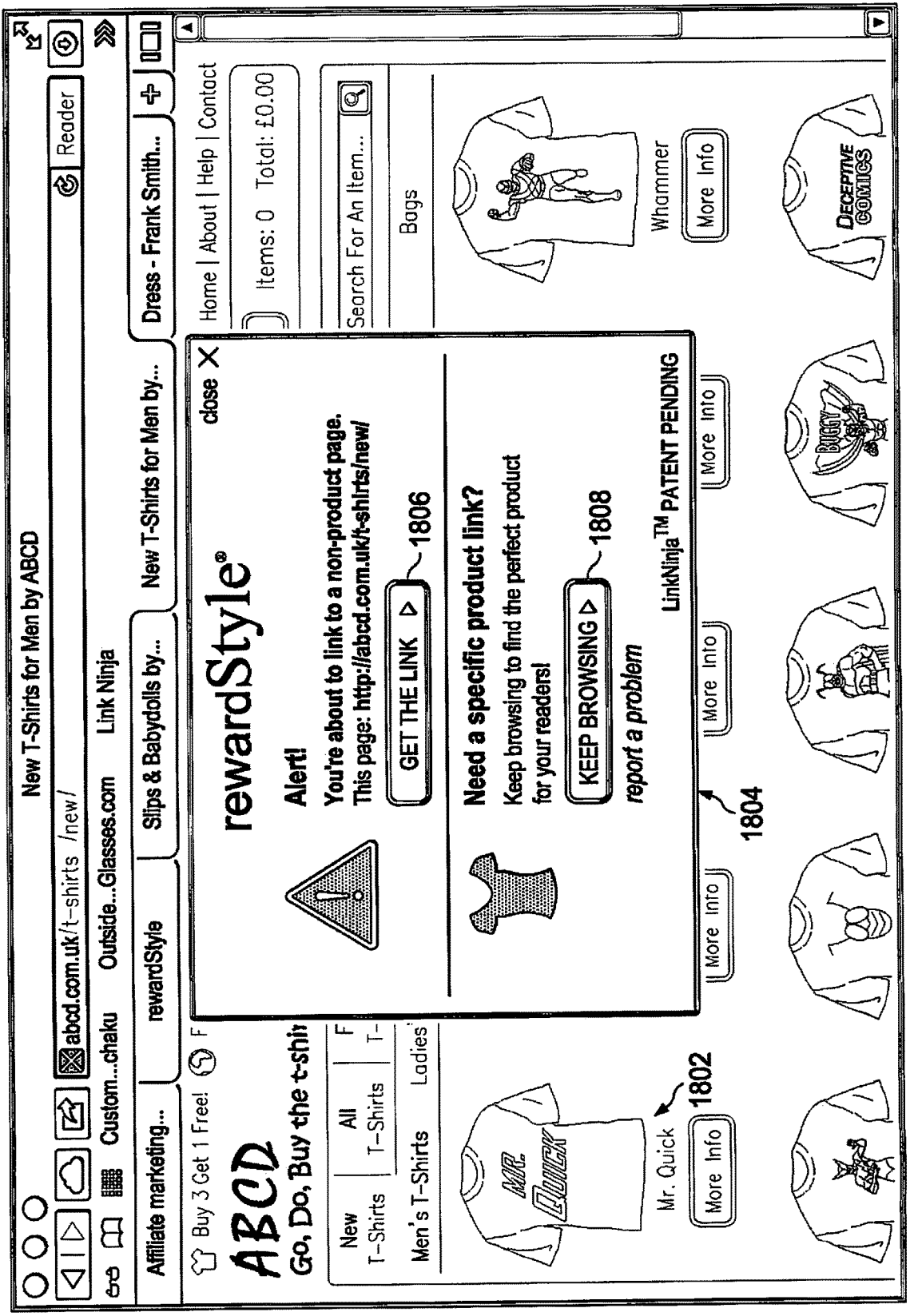
FIG. 18 depicts a screen image of a user interface message box notifying the publisher that the advertiser affiliate webpage is a non-product page for purposes of affiliate network advertiser link creation.

FIG. 18 depicts a screen image of a user interface message box notifying the publisher that the advertiser affiliate webpage 1802 is a non-product page for purposes of affiliate network advertiser link creation. Again, the link generation server 120 causes an iframe 1804 to be presented in the publisher's web browser with such information. Even though the webpage is a non-product page, the publisher may still choose to generate an affiliate network advertiser link URL 1806 to the page or may simply keep browsing 1808 and return to the affiliate website. The creation of an affiliate network advertiser link URL 1806 affords additional web metrics for analytical purposes, and may even identify affiliates that may be of interest to other users.

Figure 19:
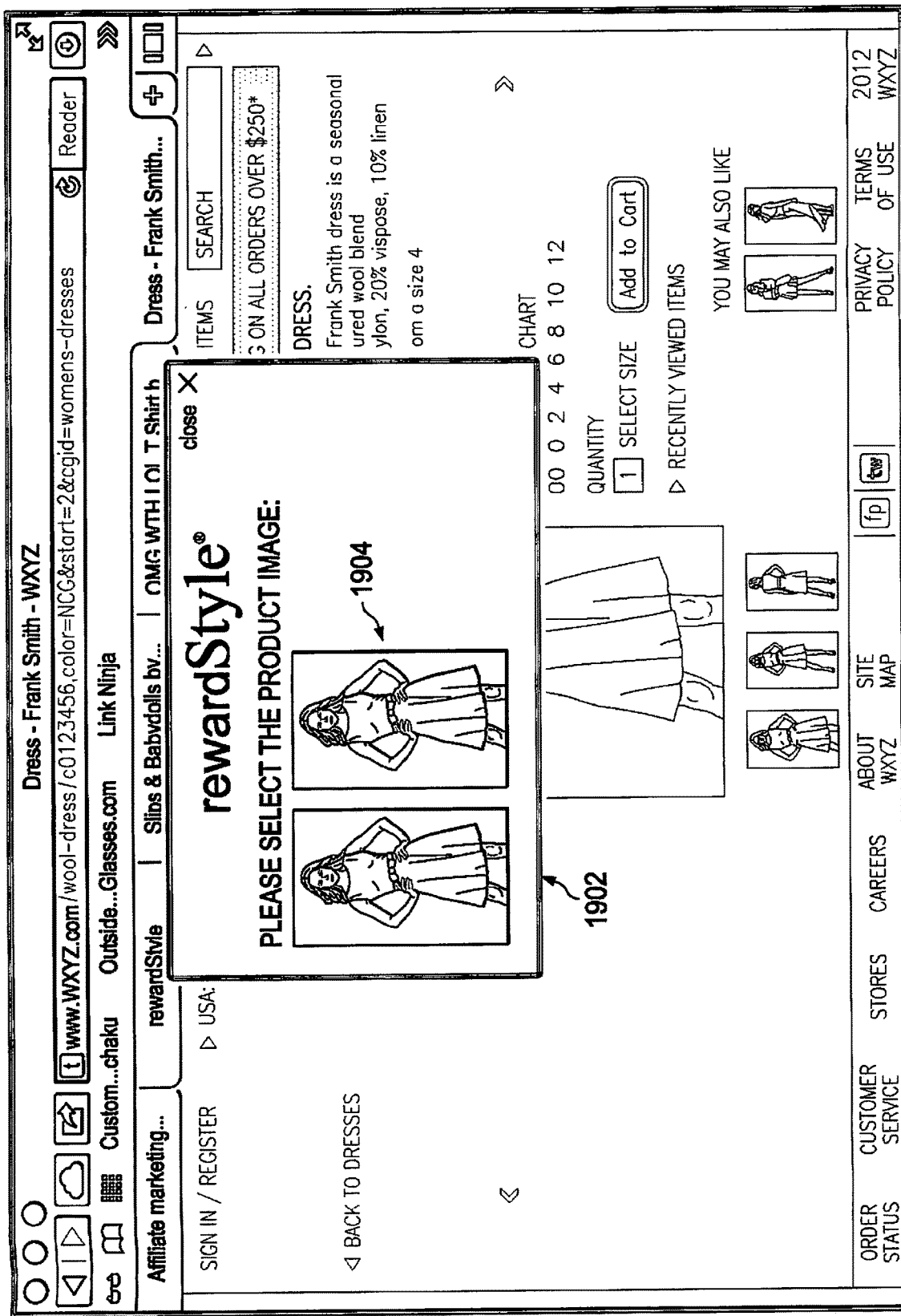
FIG. 19 depicts a screen image of a user interface message box notifying the publisher that the advertiser affiliate product webpage information does not exist in the system database, further requesting input from the publisher regarding image selection for a new database record.

FIG. 19 depicts a screen image of a user interface message box notifying the publisher that the advertiser affiliate product webpage information does not exist in the system database, further requesting input from the publisher regarding image selection for a new database record. Again, the link generation server 120 causes an iframe 1902 to be presented in the publisher's web browser with such information. Because the record does not exist in the database, the publisher is provided multiple images of the product 1904, taken from the webpage data, and required to select one as representative of the product. Once an image is selected the publisher is then presented with an interface like that in FIG. 20.

Figure 20:
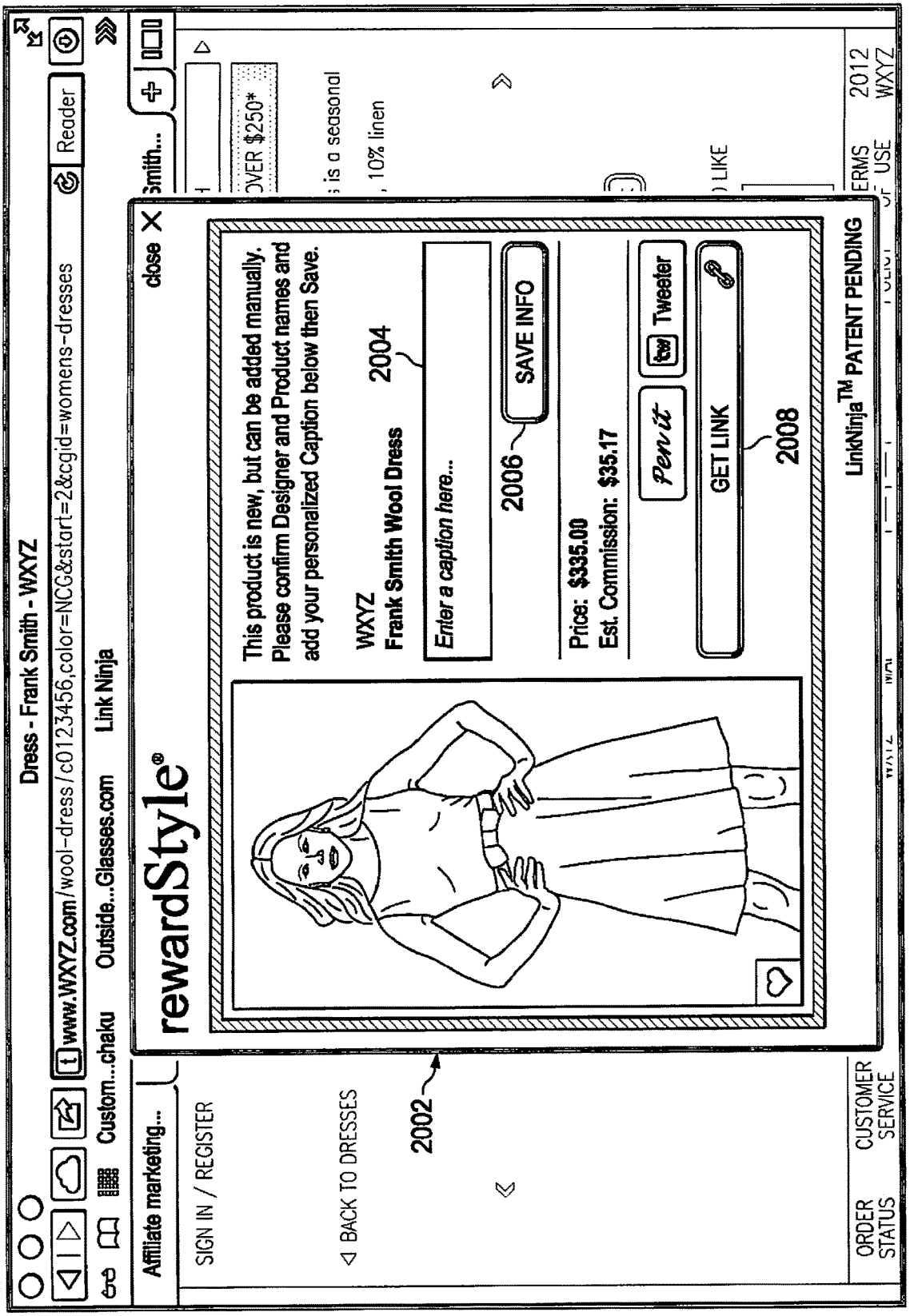
FIG. 20 depicts a screen image of a user interface message box notifying the publisher that the product webpage information has been scraped and is prepared for addition to the database along with the publisher-chosen product image.

FIG. 20 depicts a screen image of a user interface message box notifying the publisher that the product webpage information has been scraped and is prepared to be added to the database along with the publisher-chosen product image. Again, the link generation server 120 causes an iframe 2002 to be presented in the publisher's web browser, displaying the prepared product record information prior to saving the information in the database 180. The publisher has the opportunity to enter a caption 2004 to be included with the record. Once the publisher selects the save button 2006 the record is written to the database 180. A dynamically created affiliate network advertiser link URL is also created 2008 as previously described, saved to the database, and made available to the publisher for embedding in a publication.

Figure 21:
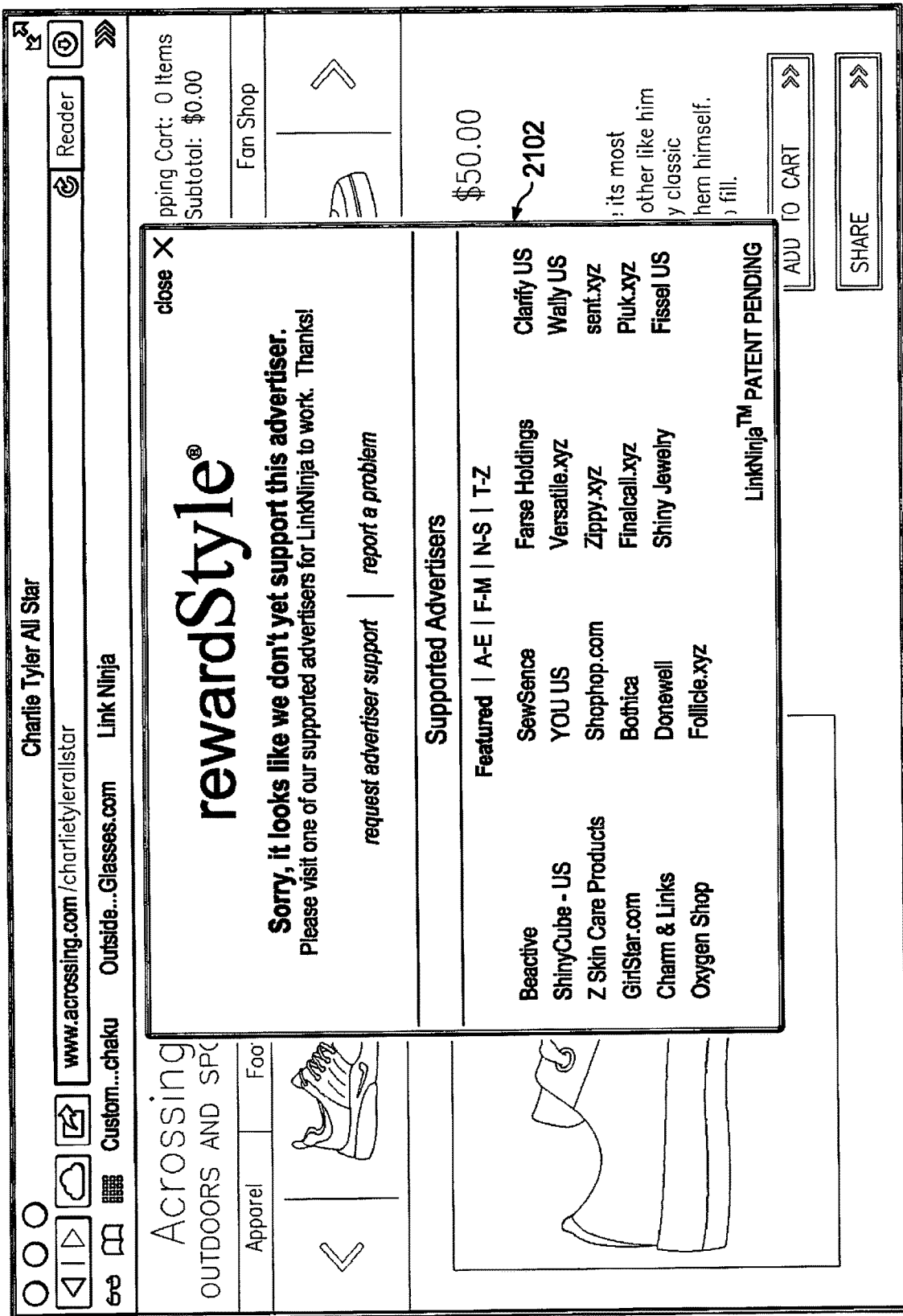
FIG. 21 depicts a screen image of a user interface message box notifying the publisher that the current advertiser product website is not a member of an associated affiliate network.

FIG. 21 is a screen image of a user interface message box notifying the publisher that the current advertiser website is not a member of an associated affiliate network. If the publisher browses to a non-member advertiser website and attempts to select a product or non-product link, the link generation server 120 causes an iframe 2102 to be presented in the publisher's web browser with a message that the advertiser is not supported. This is so because non-member advertisers do not have agreements in place regarding payment of commissions on product transactions facilitated by the present disclosure.

Figure 22:
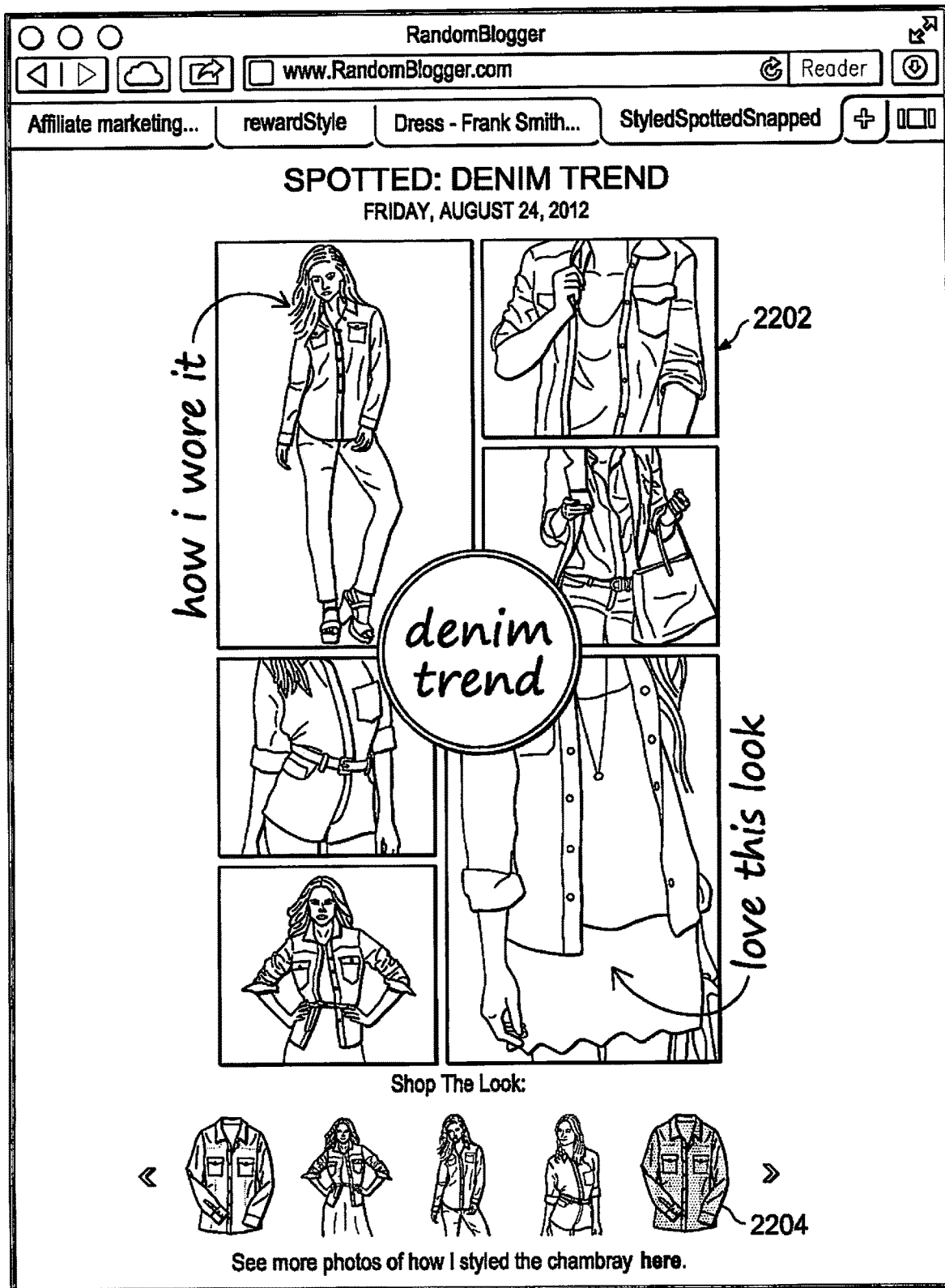
FIG. 22 depicts a typical publisher blog utilizing the widget apps in an HTML document publication.

FIG. 22 depicts a typical publisher blog utilizing the widget apps in an HTML document publication. As depicted, the blogger published images of a product being worn 2202 along with the widget app described in FIG. 14, namely, the scrolling carousel containing multiple affiliate network advertiser link URLs to the displayed products 2204. The goal of the publisher is to entice another to investigate the available product links and to make a purchase by selecting an affiliate link 2204 to the advertiser affiliate webpage and completing the transaction. In so doing, the publisher earns a commission fee.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As indicated above, aspects of this invention pertain to specific methods implementable through various computer systems. In an alternate embodiment, the invention may be implemented as a computer program product for use with a computer system. Those skilled in the art should readily appreciate that programs defining the function steps of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description.

All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A computer-implemented method for dynamic management of affiliate links, the method comprising:
   receiving, at a first processor from a second processor, a request for a web browser application tool that includes one or more items of computer-readable code that are adapted to:
   (i) be installed into and to operate in coordination with a web browser operating on the second processor, and
   (ii) initiate generation of a custom link to a webpage displayed on the web browser without manual entry of a web address URL link of the webpage by an operator of the second processor; and
   providing the web browser application tool to the second processor for installation into the web browser, wherein the web browser application tool is installed by the second processor as a web browser application accessed via a single selection of an element displayed on the web browser, and in response to the single selection of the element as the webpage is displayed on the web browser, the accessed web browser application is configured to display a user interface including a control element selectable to initiate the generation of the custom link.

2. The computer-implemented method of claim 1, wherein the user interface further includes information associated with a product associated with the webpage.

3. The computer-implemented method of claim 1, wherein the web browser application tool is configured to display an estimated commission associated with a product on the webpage.

4. The computer-implemented method of claim 1, wherein the web browser application tool is configured to display one or more images associated with a product displayed on the webpage.

5. The computer-implemented method of claim 1, wherein the web browser application tool is configured to receive a selection of one image among one or more images provided by the webpage.

6. The computer-implemented method of claim 1, wherein the web browser application tool is configured to request input from an operator of the second processor regarding image selection.

7. The computer-implemented method of claim 1, wherein the user interface is a first user interface, and wherein the web browser application tool is configured to provide a second user interface configured to receive input for a product image.

8. The computer-implemented method of claim 1, wherein the web browser application tool is configured to display a notification that an advertiser, a retailer, or an owner associated with the webpage is not supported.

9. The computer-implemented method of claim 1, wherein the web browser application tool is configured to display extracted webpage information.

10. The computer-implemented method of claim 1, wherein the web browser application tool is configured to determine whether the second processor is associated with a registered publisher.

11. A system for dynamic management of affiliate links, the system comprising:
    at least one server having at least one processor configured to:
    provide a web browser application tool for installation that includes one or more items of computer-readable code that are adapted to:
    (i) be installed into and to operate in coordination with a web browser operating on a second processor, and
    (ii) initiate generation of a custom link to a webpage displayed on the web browser without manual entry of a web address URL link of the webpage by an operator of the second processor,
    wherein the web browser application tool is installed by the second processor as a web browser application accessed via a single selection of an element displayed on the web browser, and in response to the single selection of the element as the webpage is displayed on the web browser, the accessed web browser application is configured to display a user interface including a control element selectable to initiate the generation of the custom link;
    be in network communication with the web browser application tool to receive a request from the second processor in response to a selection of the control element; and
    generate the custom link to the webpage in response to the request received from the second processor and input into the web browser application tool.

12. The system of claim 11, wherein the user interface further includes information associated with a product associated with the webpage.

13. The system of claim 11, wherein the web browser application tool is configured to display an estimated commission associated with a product on the webpage.

14. The system of claim 11, wherein the web browser application tool is configured to display one or more images associated with a product displayed on the webpage.

15. The system of claim 11, wherein the web browser application tool is configured to receive a selection of one image among one or more images provided by the webpage.

16. A non-transitory computer-readable medium storing computer-executable instructions which, when executed by a first processor of a server configured to provide a web browser application tool, cause the first processor to perform operations comprising:
    receiving, from a second processor, a request for a web browser application tool that includes one or more items of computer-readable code that are adapted to:
    (i) be installed into and to operate in coordination with a web browser operating on the second processor, and
    (ii) initiate generation of a custom link to a webpage displayed on the web browser without manual entry of a web address URL link of the webpage by an operator of the second processor; and
    providing the web browser application tool to the second processor for installation into the web browser, wherein the web browser application tool is installed by the second processor as a web browser application accessed via a single selection of an element displayed on the web browser, and in response to the single selection of the element as the webpage is displayed on the web browser, the accessed web browser application is configured to display a user interface including a control element selectable to initiate the generation of the custom link.

17. The non-transitory computer-readable medium of claim 16, wherein the user interface further includes information associated with a product associated with the webpage.

18. The non-transitory computer-readable medium of claim 16, wherein the web browser application tool is configured to display an estimated commission associated with a product on the webpage.

19. The non-transitory computer-readable medium of claim 16, wherein the web browser application tool is configured to display one or more images associated with a product displayed on the webpage, and wherein the web browser application tool is configured to receive a selection of one image among the one or more images.

20. The computer-implemented method of claim 1, wherein the custom link to the webpage is a link for integration into online content of a publisher associated with the second processor, and wherein interactions with the webpage, when the webpage is accessed via the custom link, are tracked in association with the publisher.

\* \* \* \* \*